(12) United States Patent
Lahiri et al.

(10) Patent No.: US 11,386,804 B2
(45) Date of Patent: Jul. 12, 2022

(54) INTELLIGENT SOCIAL INTERACTION RECOGNITION AND CONVEYANCE USING COMPUTER GENERATED PREDICTION MODELING

(71) Applicant: International Business Machines Corporation, Armonk, NY (US)

(72) Inventors: Kaushik Lahiri, Kolkata (IN); Sandipan Sengupta, Kolkata (IN); Sabyasachi Chatterjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/930,564

(22) Filed: May 13, 2020

(65) Prior Publication Data
US 2021/0358324 A1 Nov. 18, 2021

(51) Int. Cl.
*G09B 19/00* (2006.01)
*G06Q 30/00* (2012.01)
(Continued)

(52) U.S. Cl.
CPC ............. *G09B 19/00* (2013.01); *G06N 20/00* (2019.01); *G06Q 30/0185* (2013.01);
(Continued)

(58) Field of Classification Search
CPC combination set(s) only.
See application file for complete search history.

(56) References Cited

U.S. PATENT DOCUMENTS

| 7,725,547 B2 | 5/2010 | Albertson et al. |
| 8,346,863 B2 * | 1/2013 | Cheng ................. H04M 7/0036 709/204 |

(Continued)

FOREIGN PATENT DOCUMENTS

WO    WO-2009077901 A1 *   6/2009   ......... H04L 12/1822

OTHER PUBLICATIONS

Sarfraz et al., "A Multimodal Assistive System for Helping Visually Impaired in Social Interactions", Informatik-Spectrum, Dec. 2017, 7 pages.

(Continued)

*Primary Examiner* — Pierre E Elisca
(74) *Attorney, Agent, or Firm* — Heslin Rothenberg Farley & Mesiti P.C.; Michael A. Petrocelli, Esq.

(57) ABSTRACT

A method, computer program product, and system include a processor(s) obtaining, environmental data comprising captured audio data and captured image data. The processor(s) generates, based on the environmental data, a user profile for the user, by cognitively analyzing the environmental data to perform a binary valuation of one or more pre-defined core attributes. The processor identifies, based on the environmental data, one or more entities within the vicinity of the user. The processor(s) generates a subject profile for each entity of the one or more entities by cognitively analyzing the environmental data to perform the binary valuation of the one or more pre-defined core attributes. The processor(s) predicts perceived positive or negative outcome of the user initiating a contact with each entity of the one or more entities. The processor(s) generates a recommendation to initiate the contact with the at least one entity and transmits the recommendation.

15 Claims, 12 Drawing Sheets

(51) Int. Cl.
*G08B 6/00* (2006.01)
*G06Q 50/00* (2012.01)
*G06N 20/00* (2019.01)
*G06Q 30/06* (2012.01)

(52) U.S. Cl.
CPC ......... *G06Q 30/0631* (2013.01); *G06Q 50/01* (2013.01); *G08B 6/00* (2013.01)

(56) References Cited

U.S. PATENT DOCUMENTS

| | | | | |
|---|---|---|---|---|
| 8,380,727 | B2* | 2/2013 | Takamatsu | G06Q 30/02 |
| | | | | 707/758 |
| 9,900,753 | B2* | 2/2018 | Zhou | H04W 4/029 |
| 10,325,144 | B2* | 6/2019 | Zhang | G06F 3/011 |
| 10,489,445 | B1* | 11/2019 | Carter | G06V 20/30 |
| 10,594,757 | B1* | 3/2020 | Shevchenko | H04N 7/147 |
| 10,743,131 | B2* | 8/2020 | Shingler | G06F 3/04817 |
| 2007/0069901 | A1* | 3/2007 | Tuck | C11D 3/50 |
| | | | | 340/573.1 |
| 2007/0282621 | A1* | 12/2007 | Altman | H04W 4/21 |
| | | | | 705/319 |
| 2009/0058611 | A1* | 3/2009 | Kawamura | H04W 4/023 |
| | | | | 340/10.1 |
| 2014/0222806 | A1* | 8/2014 | Carbonell | G06F 16/9535 |
| | | | | 707/732 |
| 2015/0199918 | A1 | 7/2015 | Jagannathan et al. | |
| 2016/0028680 | A1* | 1/2016 | Granville | G06F 3/0488 |
| | | | | 709/206 |
| 2016/0111019 | A1* | 4/2016 | Chang | G09B 19/04 |
| | | | | 434/185 |
| 2017/0064363 | A1* | 3/2017 | Wexler | G06K 9/00671 |
| 2018/0047070 | A1* | 2/2018 | Koenig | G06Q 50/01 |
| 2018/0114331 | A1* | 4/2018 | Wexler | G06F 16/5838 |
| 2018/0115797 | A1* | 4/2018 | Wexler | H04L 51/32 |
| 2019/0018901 | A1* | 1/2019 | Lin | G06Q 30/0201 |
| 2019/0087749 | A1* | 3/2019 | Adams | G06N 20/00 |
| 2019/0235581 | A1* | 8/2019 | Zenoff | G06F 1/1671 |
| 2020/0174734 | A1* | 6/2020 | Gomes | G10L 25/84 |

OTHER PUBLICATIONS

Buimer et al., "Conveying Facial Expressions to Blind and Visually Impaired Persons Through a Wearable Vibrotactile Device", PLoS One, vol. 13(3), Mar. 27, 2018, 18 pages.

Mell et al., "The NIST Definition of Cloud Computing", National Institute of Standards and Technology, U.S. Dept. of Commerce, NIST Special Publ. 800-145, Sep. 2011, 7 pages.

* cited by examiner

INTELLIGENT SOCIAL INTERACTION RECOGNITION AND CONVEYANCE USING COMPUTER GENERATED PREDICTION MODELING

BACKGROUND

There are many social interactions that take place on a daily basis that impact our understanding of the world. Many factors influence our social interactions including cultural norms, situational environments, past interactions with individuals, verbal communication, eye contact, facial gestures, other forms of body language, etc. Being able to recognize and understand all of these factors can be challenging, especially when there are various psychological and physical barriers that can impede effective communication.

SUMMARY

Shortcomings of the prior art are overcome and additional advantages are provided through the provision of a method for monitoring social interactions and generating behavioral recommendations. The method includes, for instance: monitoring, by one or more processors, via one or more input devices communicatively coupled to the one or more processors, elements in a user's vicinity, the monitoring including detecting one or more individuals in the user's vicinity, detecting one or more actions being performed by the one or more individuals, the one or more actions including physical behaviors of the one or more individuals, and detecting context elements of the one or more actions being performed; analyzing, by the one or more processors, (i) the one or more individuals in the user's vicinity to determine whether the one or more individuals can be identified, (ii) the one or more actions to determine a current circumstance of the one or more individuals, and (iii) the context elements of the one or more actions to determine a current environment in which the one or more individuals are located, the analyzing including predicting a probable impact of one or more social interactions that could be performed between the user and the one or more individuals; and generating, by the one or more processors, a behavioral recommendation to be communicated to the user, the behavioral recommendation including a social interaction of the one or more social interactions, the generating including selecting the behavioral recommendation based on determining that the behavioral recommendation is predicted to provide a beneficial psychological impact to the user.

Shortcomings of the prior art are overcome and additional advantages are provided through the provision of a computer program product for generating a behavioral recommendation. The computer program product comprises a storage medium readable by a processing circuit and storing instructions for execution by the processing circuit for performing a method. The method includes, for instance: obtaining, by one or more processors, based on monitoring a defined vicinity of a user, via one or more input devices communicatively coupled to the one or more processors, the one or more input devices comprising an audio capture device and an image capture device, environmental data comprising captured audio data and captured image data; generating, by the one or more processors, based on the environmental data, a user profile for the user, wherein generating the user profile comprises cognitively analyzing the environmental data to perform a binary valuation of one or more pre-defined core attributes; identifying, by the one or more processors, based on the environmental data, one or more entities within the vicinity of the user; based on the identifying, generating, by the one or more processors, based on the environmental data, a subject profile for each entity of the one or more entities, wherein generating the subject profile, for each entity of the one or more entities, comprises cognitively analyzing the environmental data to perform the binary valuation of the one or more pre-defined core attributes; predicting, by the one or more processors, based on applying a classifier algorithm to the user profile and each subject profile, a classification representing a perceived positive or negative outcome of the user initiating a contact with each entity of the one or more entities; based on predicting a positive outcome for at the user initiating the contact with at least one entity of the one or more entities, generating, by the one or more processors, a recommendation to initiate the contact with the at least one entity; and transmitting, by the one or more processors, to the user, via a haptic interface of the one or more input devices, the recommendation to initiate the contact with the at least one entity, wherein the haptic interface indicates a location of the at least one entity, relative to the user, within the vicinity.

Shortcomings of the prior art are overcome and additional advantages are provided through the provision of a system for predicting likelihood of a condition. The system includes a memory, one or more processors in communication with the memory, and program instructions executable by the one or more processors via the memory to perform a method. The method includes, for instance: obtaining, by the one or more processors, based on monitoring a defined vicinity of a user, via one or more input devices communicatively coupled to the one or more processors, the one or more input devices comprising an audio capture device and an image capture device, environmental data comprising captured audio data and captured image data; generating, by the one or more processors, based on the environmental data, a user profile for the user, wherein generating the user profile comprises cognitively analyzing the environmental data to perform a binary valuation of one or more pre-defined core attributes; identifying, by the one or more processors, based on the environmental data, one or more entities within the vicinity of the user; based on the identifying, generating, by the one or more processors, based on the environmental data, a subject profile for each entity of the one or more entities, wherein generating the subject profile, for each entity of the one or more entities, comprises cognitively analyzing the environmental data to perform the binary valuation of the one or more pre-defined core attributes; predicting, by the one or more processors, based on applying a classifier algorithm to the user profile and each subject profile, a classification representing a perceived positive or negative outcome of the user initiating a contact with each entity of the one or more entities; based on predicting a positive outcome for at the user initiating the contact with at least one entity of the one or more entities, generating, by the one or more processors, a recommendation to initiate the contact with the at least one entity; and transmitting, by the one or more processors, to the user, via a haptic interface of the one or more input devices, the recommendation to initiate the contact with the at least one entity, wherein the haptic interface indicates a location of the at least one entity, relative to the user, within the vicinity.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
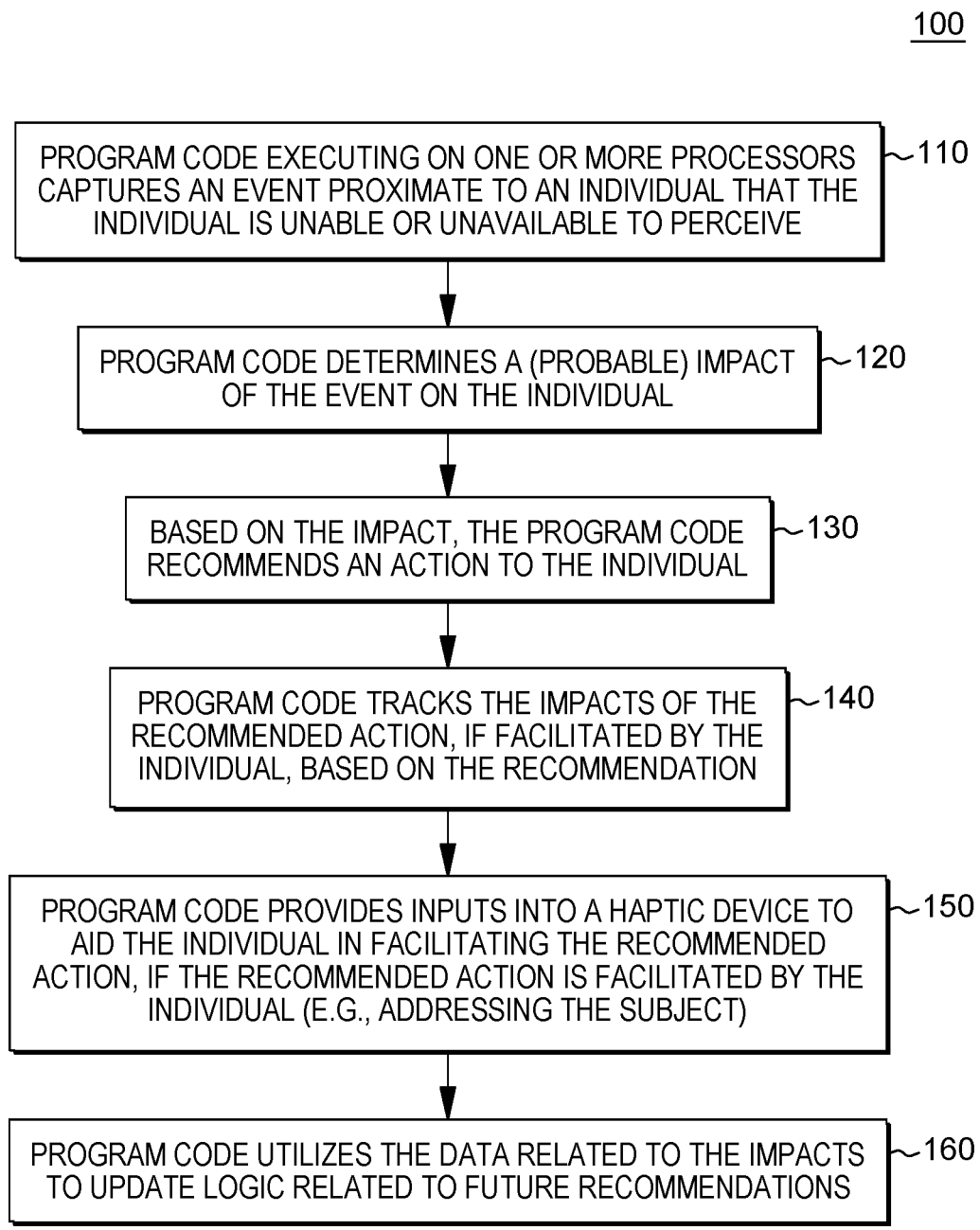
FIG. 1 is a workflow that illustrates various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 10:
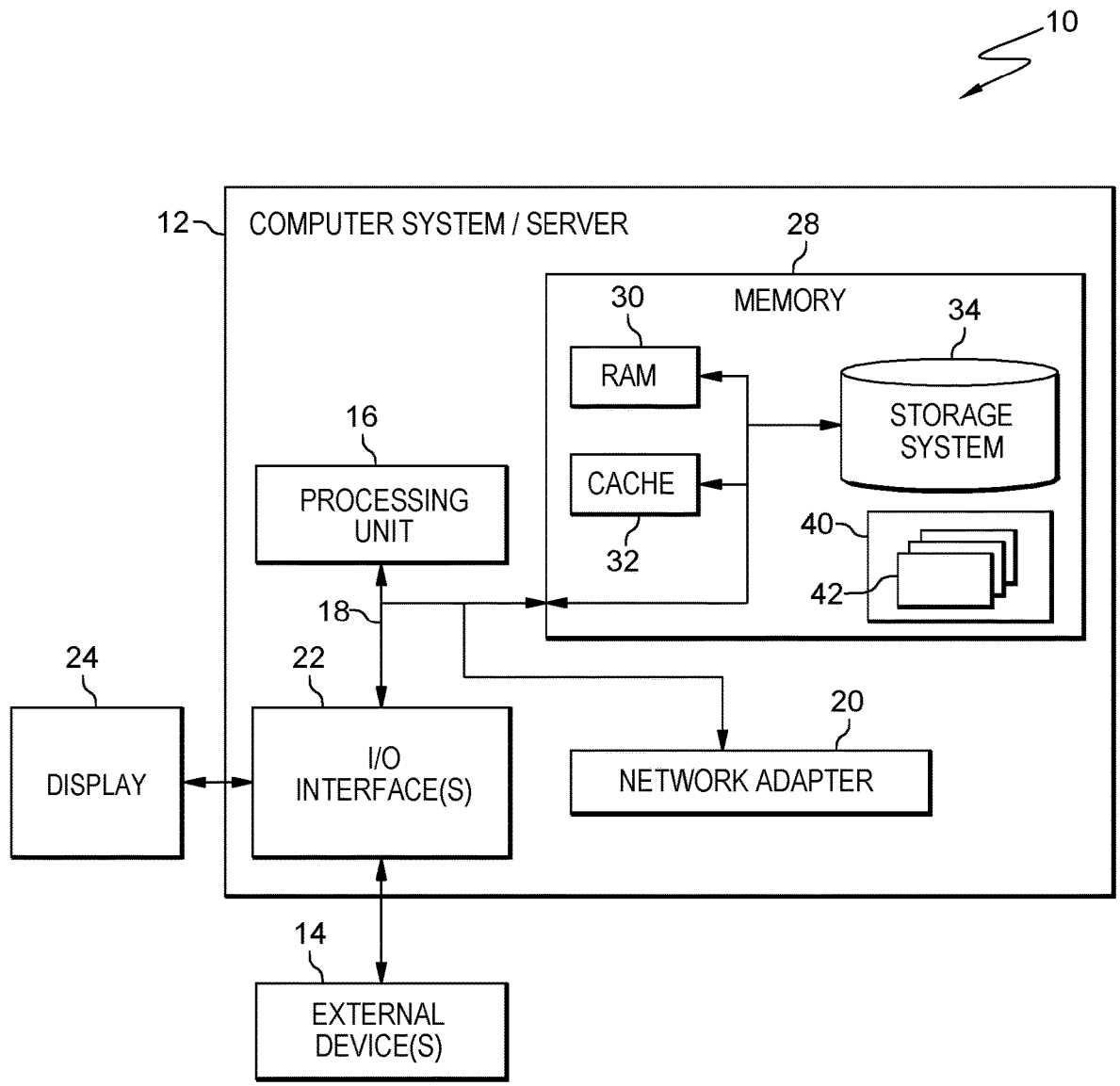
FIG. 10 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 10 as program/utility 40, having a set (at least one) of program modules 42, may be stored in memory 28.

Embodiments of the present invention include computer-implemented methods, computer program products, and computer systems that enable users to obtain useful data about a current social interaction with at least one other individual and convey information about the social interaction to the users. This useful data can be understood as being of particular use to individuals regardless of any particular challenges these individuals may have in perceiving interactions, in real-time. For example, an individual who is visually impaired would have particular challenges in perceiving certain social interaction information, such as visual cues. Meanwhile, an individual who is neuro-atypical could have challenges perceiving social cues in interactions. Finally, an individual in an environment with unknown cultural differences from that individual's familiar cultural environment could miss or misinterpret certain norms includes in the interactions. Because individuals, based on their qualities, introduce various challenges into social interaction perception, embodiments of the present invention reliably facilitate social interactions between individuals based on interpreting this data in a manner that accounts for these types of factors. Program code in embodiments of the present invention can utilize these data, after the program code obtains the data, for example, as parameters entered into artificial intelligence (AI) systems, for model training and machine learning. One such system, provided by way of example, only, and not to imply any limitations, is IBM Watson®, which the program code in some embodiments of the present invention can utilize as a cognitive agent (e.g., AI) to perform one or more of the described analyses. IBM Watson® is a registered trademark of International Business Machines Corporation, Armonk, N.Y., US. By analyzing one or more context variables to provide a composite behavioral recommendation to an individual, embodiments of the present invention provide improvements to AI systems that utilize this data. As will be explained herein, in embodiments of the present invention, the program code can classify social interactions by applying both implicit and explicit feedback. Utilizing this feedback, in embodiments of the present invention, the program code summarizes and provides users with most relevant parts of a social interaction (e.g., context variables), so that a system can quickly extract this information and produce a behavioral recommendation. Although many examples of individuals with particular perception challenges would be positively impacted by utilizing aspects of the present invention in social interactions, visually impaired individuals are utilized in certain of the examples herein, to illustrate various benefits of utilizing embodiments of the present invention in various scenarios, when the data provided by the program code in embodiments of the present inventions can provide insights that cannot be perceived by the individual in the example.

Specifically, in some embodiments of the present invention, program code executing on one or more processors monitors, via one or more input devices communicatively coupled to the processors, (with permission from subjects being monitored) elements in a user's vicinity. The program code monitors various environmental attributes. For examples, the program code can detect and monitor one or more individuals in the user's vicinity, one or more actions being performed by the one or more individuals (e.g., physical behaviors of the one or more individuals, context elements of the one or more actions being performed). In embodiments of the present invention, the program code collects and analyzes data from the user and individuals within the vicinity of the user with the express consent of the individuals whose data is collected and analyzed. All data collected and handled by the program code in embodiments of the present invention is collected based on users as well as subjects opting into participation. The program code handles and stores all data discretely and securely, and disposes of any data (if/when it disposes of data) discretely and securely. A user is provided with an option to opt out at any time and data collection and analysis is performed by the program code with the express consent of the user (and the subjects). Thus, with the consent of participants (users and individuals within a vicinity of the user), the program code analyzes: (i) the one or more individuals in the user's vicinity to determine whether the one or more individuals can be identified, (ii) the one or more actions to determine a current circumstance of the one or more individuals, and/or (iii) the context elements of the one or more actions to determine a current environment in which the one or more individuals are located. Based on this analysis, the program code predicts probable impacts of one or more social interactions between the user and the one or more individuals. Based on these predictions, the program code generates a behavioral recommendation and communicates this recommendation to the user. The program code also aids the user during the course of the interaction, via a client device. Additionally, the program code continues to monitor the environmental attributes such that the program code can determine if the predicted outcome of the interaction is the actual outcome. The program code can update the prediction logic (model) based on the outcomes matching or not matching. This updated logic can be applied by the program code when making subsequent recommendations.

Embodiments of the present invention include computer-implemented methods, computer program products, and computer systems that enable a user, particularly a user with compromised perception, including but not limited to visual perception challenges, to decide whether to initiate communication with a subject (another individual) based on whether the user and the subject share various values, which the program code determines based, in part, by monitoring (with permission) interactions and behaviors of the user and the subjects. For example, in some embodiments of the present invention, program code maintains and continuously updated value perceptions (based on data collection and interpretation by at least one cognitive agent) of the user as well as subjects within the vicinity of the user. The program code utilizes these perceptions to determine whether to recommend to the user that the user should initiate a conversation and/or other contact with a subject at a given moment in time. This recommendation is particularly useful for users with perception limitations because the program code is perceiving (collecting, analyzing, interpreting, updating, etc.) information that the user cannot perceive, based, for example, on visual perception challenges experienced by the user. Thus, the program code can provide decision-making guidance to the user that is not otherwise available to these users, based on the perception challenges of the user. As will be discussed in great detail herein, the program code can classify the values (perceive the values) of a given individual (a potential subject and/or the user), based, in part on: a) expressed opinions in social media by the given individual and b) correlated values of bodily parameters measured from the given individual in the event of knowledge about particular event related to the subject.

While some existing social interaction data extraction solutions are tied to specific actions (e.g., using software to determine head orientation of nearby individuals), embodiments of the present invention monitor and analyze one or more individuals in a user's vicinity, social interactions between a user and one or more individuals in the user's vicinity, and the context of the one or more social interactions. Embodiments of the present invention include program code executing on one or more processors that provides data summarization for individuals, social interactions, environments, and contexts in order to generate a behavioral recommendation for a user. Some embodiments of the present invention include program code that obtains data based on monitoring a user's interactions with others while the user communicates with particular individuals, and the program code can be used to determine a relative context awareness of the environment in which a social interaction is taking place.

The data ascertained from a given social interaction is personalized for the user because different users could interact differently in response to certain social interactions within various environments and contexts. Further, behavioral recommendations are generated based on the behavioral recommendation being predicted to provide a beneficial psychological impact to the user, and the probable impacts predicted can change depending on the user. In some embodiments of the present invention, the program code determines that a user has certain behavioral patterns in a given social context, including, for example, social interactions with specific individuals or categories of individuals, based on tracking behaviors or conversations of the user. Tracking behaviors of the user can include, for example, analyzing and contextualizing past interactions and behaviors to determine systematically the nature of the relationship between the user and another individual for whom a behavioral response is being recommended. This analysis and contextualization can evaluate the user's perception of the individual ascertained from the past interactions and combine this perception with the user's perceived present intellectual state to derive a possible behavioral recommendation.

In some embodiments of the present invention, the program code tracks the physical behaviors of individuals (e.g., facial gestures, body language, eye contact, etc.) in the vicinity of the user as part of contextualizing the possible behavioral recommendation (e.g., whether an individual would be receptive to the user initiating a conversation). The program code, through repetition of observations, learns typical individual interactions arising from repeated behaviors and can thus develop a threshold that indicates individuals exhibiting certain behaviors are, on average, more or less receptive to certain behaviors exhibited by the user. The program code utilizes these learned interactions to predict, based on an observed social interaction, a likely response by individuals within the vicinity of the user. Thus, embodiments of the present invention generate and tune a machine learning algorithm for user-oriented behavioral recommendations.

In some embodiments of the present invention, the behavioral recommendation can be delivered to the user via an electronic device. For instance, the behavioral recommendation can include an auditory signal (e.g., voice command) or a touch-based sensory stimulation, etc. For example, the electronic device can have a touch-based sensor user interface that is divided into a plurality of segments, each segment indicating a physical location in the user's vicinity. Further, the electronic device, or a particular segment of the electronic device, can be configured to vibrate or pulsate based on the physical presence of an individual in the user's vicinity, and the intensity of the vibration or frequency of pulsation can indicate a given behavioral recommendation. The touch-based sensory stimulation can be augmented by an auditory signal (e.g., voice command) emitted by the electronic device to provide the user with a particular behavioral recommendation.

Embodiments of the present invention are inextricably linked to computing. The computer-implemented method, computer program product, and computer systems described herein utilize one or more image capture devices, noise capture devices, or other computing devices to track physical behaviors or monitor other social interactions of the user, as well as individuals in the user's vicinity, over time, and ascertain certain contexts and environments for given physical behaviors and social interactions. Further, the program code can determine how receptive a particular individual or category of individual would be to certain behaviors exhibited by the user as well as predict a psychological impact a particular behavioral recommendation would have on the user. In embodiments of the present invention where one or more image capture devices are utilized by the program code to monitor physical behaviors of individuals, the monitoring of the physical behaviors and the coordination of the physical behaviors with contexts and environments are accomplished through the user of software and hardware systems, including but not limited to, image capture devices, including image capture devices in specific positions to allow for monitoring of both the user and individuals in the user's vicinity, and noise capture devices, including noise capture devices at specific locations to allow for monitoring both conversations and ambient noise taking place in the user's vicinity. This functionality is enabled by computer systems and therefore is inextricably linked to computing.

Aspects of some embodiments of the present invention provide a practical application in providing an efficient and accurate approach to processing data for the user as well as various individuals, environments, contexts, etc. As discussed herein, embodiments of the present invention generate and update an algorithm, based on personalized behavioral recommendations in response to certain social interactions within various environments and contexts. By applying this algorithm, program code in embodiments of the present invention can predict the importance of granular elements in a given environment, context, and for a particular social interaction. The behavioral recommendations produced by the program code in embodiments of the present invention and the user's behaviors in response to the behavioral recommendations can be utilized by additional computing systems, including AI systems, as data for future behavioral recommendations. Because the program code generates a machine-learning algorithm to predict a likely response by individuals within the vicinity of the observed social interaction as well as a psychological impact of the behavioral recommendation on the user, embodiments of the present invention can extract, through this prediction, behavioral recommendations much faster and arguably more accurately than existing systems that focus on social interaction data extraction. Additionally, according to one embodiment, electronic devices can deliver behavioral recommendations to the user by way of an auditory signal (e.g., voice command) or a touch-based sensory stimulation. Advantageously, this non-visual form of communication can provide, for example, behavioral recommendations to users with various levels of visual impairment.

Embodiments of the present invention provide a specific practical application to individuals who cannot perceive and/or one or more elements of social interactions in real-time and therefore, are unable to respond in real-time. Thus, the program code in embodiments of the present invention provides practical social assistance. Returning to the example of a sight-impaired individual (which is utilized herein for illustrative purposes, only), a sight-impaired individual, in certain situations, may have more limited access to data in a given environment that can be gathered based in perceptions. In such a situation, program code in embodiments of the present invention can recommend to this individual a particular social interaction with another individual who is present in this setting. The program code can recommend that the sight impaired individual initiate a conversation with the individual, perform an action (e.g., waving a hand) directed at the individual, take no action at all, etc. As will be explained herein, the program code makes this recommendation based on a variety of factors, including but not limited to, visually detecting the presence of the individual within a given proximity of the sight-impaired individual, determining a personality compatibility between the individuals, identifying circumstantial attributes present at that point in time. This personality compatibility can include, but is not limited to, matching fields of interest, spheres of influence and/or emotional attachment based on past interactions. Circumstantial attributes can include contextual information at that point of time (e.g., whether the individual is involved in a different interaction, such as talking on the phone and/or about to get into a vehicle). As aforementioned, the recommendations provided to users by the program code in embodiments of the present invention can be of particular use not only to temporarily or permanently visually impaired individuals, but also to neuro-atypical individuals, and/or individuals moving within an unfamiliar cultural environment. The program code provides a practical benefit to these individuals by assisting the users in social interactions based on data that these individuals are unable to gather in real-time, regardless of the reason that this data is not gathered by the individuals.

Aspects of some embodiments of the present invention represent significant improvements over existing social interaction data extraction methods and analysis. As mentioned above, generally social interaction data extraction solutions are tied to specific actions without recommending behavior for an observed social interaction. Advantageously, aspects of the present invention may recommend an appropriate way to interact for an observed social interaction such as, for example, recommending initiating a conversation, recommending performing some action like waving a hand or moving out of the way, or recommending performing no action at all. Thus, unlike existing systems, embodiments of the present invention utilize highly granular data to provide a personalized behavioral recommendation.

FIG. 1 is a workflow 100 that illustrates, generally, certain aspects of some embodiments of the present invention. FIG. 1 provides this overview, but the particulars of each aspect illustrated are discussed in greater detail herein. In embodiments of the present invention, program code executing on one or more processors captures an event proximate to an individual that the individual is unable or unavailable to perceive (110). The event captured by the program can include, the program code determining that another individual is within a given proximity of the user. In some embodiments of the present invention, the program code utilizes various methods to identify and/or recognize the individual or individuals within a vicinity of a given individual.

The program code determines a (probable) impact of the event on the individual (120). This impact can be on an intellectual state of the individual and can be based on relative value perception of the subject as well as behavioral, circumstantial, relational and contextual influencing factors. Regarding the value perception, in some embodiments of the present invention, this perception can be understood to be from a point-of-view of a user (e.g., a wearer of a wearable device). As discussed herein, aspects of some embodiments of the present invention can be of particular utility to an individual with perception challenges and thus, by utilizing aspects of some embodiments of the present invention, the program code can provide utility by effectively providing a user with cognitive analyses of environmental data that a user is unable and/or unavailable to perceive. Thus, cognitive analyses of data provided by the program code that determines values of other individuals can be provided by the program code from the point-of-view of the user.

Returning to FIG. 1, the program code can determine a (probable) impact of the event on the individual (120) based on factors related to the individual, including but not limited to, perceptions of body language (e.g., eye contact, facial gestures). Other factors that can impact this recommendation can include, but are not limited to, how well the individual and the user are acquainted with each other, space between the user and the individual, a perceived benefit in initiating a conversation with the individual, whether the body language and/or physical movements of the individual indicates that the individual is busy, how well did a conversation go when the user last met the individual (tone, content, etc., during past interactions), past reactions of the individuals to public interactions with the user in the past. These non-verbal cues, which are not readily perceived by every user, would assist a user who is in a position to perceive these cues with making a decision about a response to an event. In some embodiments of the present invention, the program code determines a (probable) impact of the event on the individual (120), where the event is an interaction with another individual, based on assessing what is referred to herein as the intellectual compatibility of the individual with the other individual, referred to as the subject. To make this determination, the program code analyzes the subject's historical data to determine intellectual compatibility based on values based classifications and circumstantial attributes. The program code utilizes these values classifications to predict positive or negative outcomes.

In some embodiments of the present invention, based on the impact, the program code recommends an action to the individual (130). In some spaces, there can be more than one subject present with which the program code recommends which subject, from a group of subjects that the program code has determined could be initiated into a conversation and have a positive outcome. Thus, the program code generates a priority list and recommends a subject from that list. The program code can apply a prioritization algorithm, which is discussed in more detail herein.

In some embodiments of the present invention, the program code tracks the impacts of the recommended action, if facilitated by the individual, based on the recommendation (140). A user can select a recommendation and start a conversation with the subject. During the conversation, the program code can provide inputs into a haptic device to aid the individual in addressing the subject (150). For example, the program code can alert the individual to the positioning of the subject.

The program code utilizes the data related to the impacts to update logic related to future recommendations (160). Hence, the program code is self-learning and recommendation can improve iteratively. Thus, program code in embodiments of the present invention: 1) facilitates (and guides) social interactions, based on the program code capturing and analyzing an event proximate to a user that the user is unable to perceive and analyze based on, for example, perception challenges faced by the user, including but not limited to, visual impairment; and 2) machine learns based on a user implementing the recommendation(s), updating logic utilized to provide the recommendation(s). As will be discussed in greater detail herein, the program code generates and continually updates decision making algorithms to interpret a user's surroundings as visual cues or clues and provide the user with a recommendation for a response to the event proximate to the user. Because aspects of various embodiments of the present invention identify and interpret information that is available visually, these aspects can be understood as being particularly helpful to users with visual impairments and/or other situations or circumstances that impede the user's ability to perceived and interpret visual information. In some embodiments of the present invention, the program code provides artificial intelligence (AI) for those aspects of decision-making (in a social setting) by capturing and interpreting visual clues, to arrive at a decision.

Figure 2:
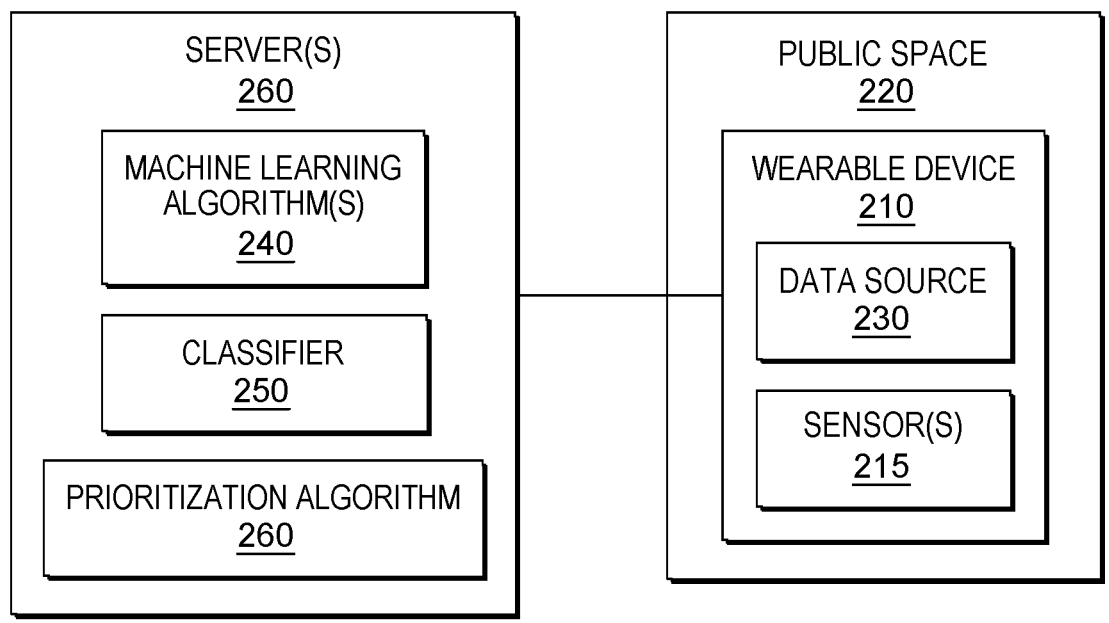
FIG. 2 depicts a technical environment into which aspects of the present invention have been implemented.

FIG. 2 is an example of a technical environment 200 into which aspects of some embodiments of the present invention can be implemented. Given that social interactions for which the program code provides intelligence can occur in public spaces, FIG. 2 is an example of such a public space 220, which includes a user with a wearable device 210. In some embodiments of the present invention, the wearable device 210 (which can be a personal computing device), which executes program code that captures images of the public space 220, including of other people who enter the public space 220. In other embodiments of the present invention, in addition to (or instead of) capturing images for recognition, program code in embodiments of the present invention utilizes artificial intelligence (AI) in this space, or social setting, to capture and interpret visual clues, to arrive at a decision regarding recognition. When an individual is proximate to the user in the in the public space 220, the wearable device 210 attempts to identify the individual. In making this identification, in addition to the AI-based classification, which can assist in any identification, the wearable device 210 can utilize different recognition facilities, including but not limited to, facial recognition, voice recognition, etc. As discussed above, certain aspects of the present invention provide a specific utility to users with visual perception limitations, thus, aspects of some embodiments of the present invention provide visual perception benefits for these individuals that extend beyond these limitations. The wearable device 210 includes one or more sensors 215 to capture image, video and/or audio data.

Returning to FIG. 2, the program code executing on the wearable device can reference a data source 230 (local to the wearable device 210 and/or remotely accessible, e.g., on a shared computing resource) to associate the identified individual with a history of previous interactions and/or repeated co-existence at the public space 220, the same location (e.g., at the office workplace, regular commuters on the same public transport, etc.). The program code applies one or more machine learning algorithms (e.g., AI) 240 to analyze one or more possibilities surrounding a conversation with the individual proximate to the user. As a public space 220 can contain multiple individuals at any time, the program code in embodiments of the present invention can recognize and analyze conversation possibilities with more than one individual, in parallel (synchronously and/or asynchronously). In applying the machine learning algorithms 240, to analyze one or more possibilities surrounding a conversation with the individual proximate to the user and provide a recommendation to the user, the program code utilizes, in its analysis, factors including, but not limited to historical data, intellectual/emotional compatibility, and/or circumstantial attributes (e.g., what the subject is doing at that moment, what has recently happened to that person, what happened during the last interaction between the user and the individual). The program code can utilize a classifier 250 to classify the individual based on what the program code determined are the perceived core and non-core values of the individual (explained in greater detail herein). The classifier, and its classification of individuals for conversations with the initial user (individual), is discussed in greater detail in FIG. 8.

Returning to the machine learning algorithms 240, the program code predicts an outcome of a conversation with the proximate individual. In some embodiments of the present invention, the outcome is a binary value. In some embodiments of the present invention, the outcome is a scaled integer value. Because the program code in embodiments of the present invention provides a quantitative outcome, comparison between various outcomes is straightforward for prioritization purposes. The program code can also assign a value based on a scale, thus indicating a degree of positivity and/or negativity in the predicted outcome. In some embodiments of the present invention, the program code applies a prioritization algorithm 260 to determine a priority of engaging the individual, not only from predicted benefits of a conversation, but also using personal needs, as determined from models including but not limited to, Maslow's Need Hierarchy. Maslow's Need Hierarchy is a motivational theory in psychology comprising a five-tier model of human needs, often depicted as hierarchical levels within a pyramid. Needs lower down in the hierarchy must be satisfied before individuals can attend to needs higher up. From the bottom of the hierarchy upwards, the needs are: physiological, safety, love and belonging, esteem, and self-actualization.

In embodiments of the present invention, program code executing on the wearable device 210, obtaining data from the one or more sensors 215 can determine needs of a given user. For example, in some embodiments of the present invention, the program code can utilize image capture capabilities of the wearable device 210, as analyzed with a cognitive agent, such as AI and/or contextual analysis algorithms to perceive and interpret facial expressions of the user and recent interactions with others. The program code of the wearable device 210, based on obtaining data from the sensors 215 can also provide readings, including but not limited to, biological information, such as blood pressure and pulse rate. The program code can utilize a classification algorithm to interpret the outward signs (facial expressions) and biological information, to classify needs of the user at the time at which the recommendation to initiate a conversation would be made by the program code. The needs can include, in accordance with the aforementioned hierarchy, physiological, safety, love and belonging, esteem, and self-actualization. The program code determines needs of the user from contextual clues, for example, based on monitoring an individual, the program code can determine that the individual has expressed a need for safety. Thus, the program code can prioritize a discussion with a neighbor who works as an insurance agent as this connection could satisfy the safety needs. Meanwhile, if the program code determines that the user is lonely (e.g., based on statements, blog posts, conversations, facial expressions, excitement indicated in biometric signs during conversations, etc.), the program code can prioritize initiating a conversation with a friend could satisfy a need for love/belonging. Based on monitored behaviors by the wearable device 210, program code utilizes a prioritization algorithm to determine, for example, that initiating conversation with the neighbor who works as an insurance agent would satisfy both a safety need and a need for love and belonging of the user. As will be discussed later herein, prioritization of contacts with individuals within a vicinity is utilized because in many public spaces 220, a user will encounter more than one individual and could ostensibly initiate a conversation or other contact with more than one individual and thus, the program code prioritized with whom the user should initiate a contact or conversation. Hence, in embodiments of the present invention, the program code prioritizes recommendations by utilizing a correlation algorithm that considers the user's needs as one more parameter of the priority order determination.

In embodiments of the present invention where the program code analyzes conversation/interaction possibilities with more than one individual, the program code provide the user, via the wearable device 210, not only a recommendation for social interaction(s) with each individual, but also with a priority list of the individuals who the program code has determined are conversation candidates. In the illustrated embodiment of the present invention, for illustrative purposes, the machine learning algorithm(s) 240, the classifier 250, and the prioritization algorithm, are executed on one or more servers 265. These servers are not located within the public space 220, in this example, although certain of them could be, in some embodiments of the present invention. The servers 265 can be physical and/or virtual machines.

In some embodiments of the present invention, based on the priority list, the program code recommends to the user (e.g., via a voice command delivered by the wearable device 210) with whom the user should start a conversation. The program code can provide recommendations in order of priority, progressing through the list, as the user provides verbal and/or other inputs to accept and/or rejection the recommendations, until the user selects a recommendation and/or the list is exhausted as all are rejected by the user. Recommendations in some embodiments of the present invention can be selected by the program code from a pre-defined list, which can include: 1) initiate a conversation; and/or 2) do not initiate a conversation. The first option can be presented in some examples as sub-options, as the program code can recommend how to initiate a conversation, including but not limited to, gesturing and/or verbally initiating the conversation.

When the user selects a recommendation, the program code, via the wearable device 210, provide the user with additional visual information that would enable the assist the user initiating the conversation. For example, is the user is sight impaired, the program code can indicate to the user (e.g., via haptic and/or auditory feedback), a direction at which to initiate the conversation (as the positioning of the individual could be such that it is captured by the device by the user is unable to perceive this positioning). Additionally, as there could be customs of which the user is unaware, the program code (via the wearable device), could guide the initiation of the conversation of the user to make the user aware of any customs or manners that would be relevant to initiating a conversation with this individual. With the guidance from the wearable device, the user can then initiate the conversation with the recommended (by the program code) and selected (by the user based on the recommendation) individual.

The wearable device 210 can be an Internet of Things (IoT) device. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. (In some embodiments of the present invention, the program code can identify an individual within a proximity of the user based on obtaining a unique identifier associated with an IoT device utilized by the individual.) Smart sensors, such as RFID tags, can track environmental factors related to an object or an area, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor can identify the source of the information. Although in some embodiments of the present invention, users actively register IoT devices for utilization by the program code, in some embodiments of the present invention, the program code could automatically discover possible IoT devices and request confirmation from the users of these devices, for example, requesting permission from a user's device before providing identification information and/or a recommendation to a user. Within the IoT, various devices can communicate with each other and can access data from sources available over various communication networks, including the Internet. Certain IoT devices can also be placed at various locations and can provide data based in monitoring environmental factors at the locations. For example, in embodiments of the present invention, localized IoT devices could within the public space 220 could provide observational data to the program code that would enable the program code to identify individuals proximate to the user and/or gather additional data to determine what recommendation should be made to the user regarding this individual.

In embodiments of the present invention, the program code utilizes one or more IoT devices to monitor and observe (with permission) both the user and the individuals in the public space 220. For example, the program code can determine is an individual is engaged in an activity and in this situation, being approach and engaged in a conversation with an individual may not be welcome. IoT devices can monitor and capture user activity through the collection of a wide range of data. IoT devices can collect video, image, movement, and audio data, all of which can assist the program code in determining whether the user is engaged in an activity which could preclude being open to a conversation. In various embodiments of the present invention, program code can determine that users are in application sessions on personal devices and therefore, are not available to converse with the user, an IoT device could determine one or more of the following: 1) the user is visually focused on the session; 2) the user is engaging a behavior that indicates engagement with the session; and/or 3) the user is engaged in conversations that are relevant to the session.

Returning to FIG. 2, in the technical environment 200, the data source 230, the machine learning algorithms 240, the prioritization algorithm 260, and the classifier algorithm 250 (which can be considered a machine learning algorithm), are all depicted as being part of a shared computing system (e.g., a cloud), which is remotely accessible by the wearable device 210 of the user. However, this is just one possible technical configuration for these functionalities. For example, these resources could all be local (or some could be local) to the wearable device 210.

Figure 3:
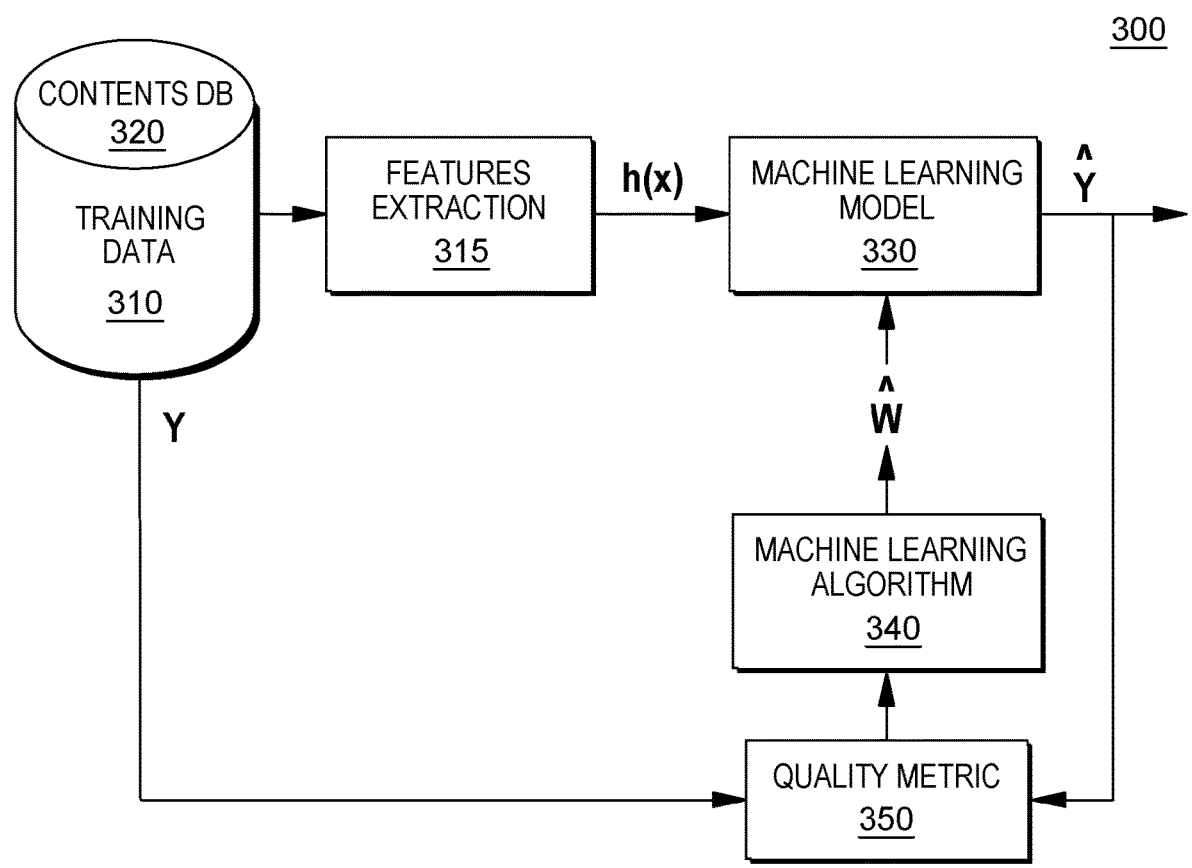
FIG. 3 further illustrates a machine learning training system 300 that can be utilized in embodiments of the present invention to perform cognitive analyses of sensor and Internet of Things (IoT) data to generate a recommendation for a given user.

FIG. 3 further illustrates a machine learning training system 300 that can be utilized to perform cognitive analyses of sensor and IoT data to generate a recommendation for a given user. Program code can obtain data in embodiments of the present invention from one or more personal devices (e.g., IoT devices, sensors, personal health trackers, physical activity trackers, smart watches, etc.), which the user and one or more individuals within a vicinity of the user can both be utilizing. Program code in an embodiment of the present invention can obtain data from these personal devices indicating a physical state of each individual and also, activities that the individual and the user are engaged in. For example, a personal device can include an accelerometer and/or a gyroscope. The program code can utilize these motion sensing devices to identify physical activities. Machine learning (ML) solves problems that cannot be solved by numerical means alone. In this ML-based example, program code extracts various features/attributes from training data 310, which can be resident in one or more databases 320 comprising IoT data (e.g., sensor data). In some embodiments of the present invention, the training data 340 can comprise historical activity data of the user with the identified individual (e.g., past conversations and interactions). The features are utilized to develop a predictor function, h(x), also referred to as a hypothesis, which the program code utilizes as a machine learning model 330. In identifying various features/attributes (e.g., patterns) in the training data 340, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code can utilize a machine learning algorithm 340 to train the machine learning model 330 (e.g., the algorithms utilized by the program code), including providing weights for the conclusions, so that the program code can prioritize various interactions, in accordance with the predictor functions that comprise the machine learning model 330. The conclusions can be evaluated by a quality metric 350. By selecting a diverse set of training data 340, the program code trains the machine learning model 330 to identify and weight various attributes (e.g., features, patterns) that correlate to various past interactions between the user and the individual(s). Based on modeling the user's behavior as related to a given individual, the program code can determine whether temporal sensor data represents an established pattern, indicating that the user should or should not engage with the individual.

Figure 4:
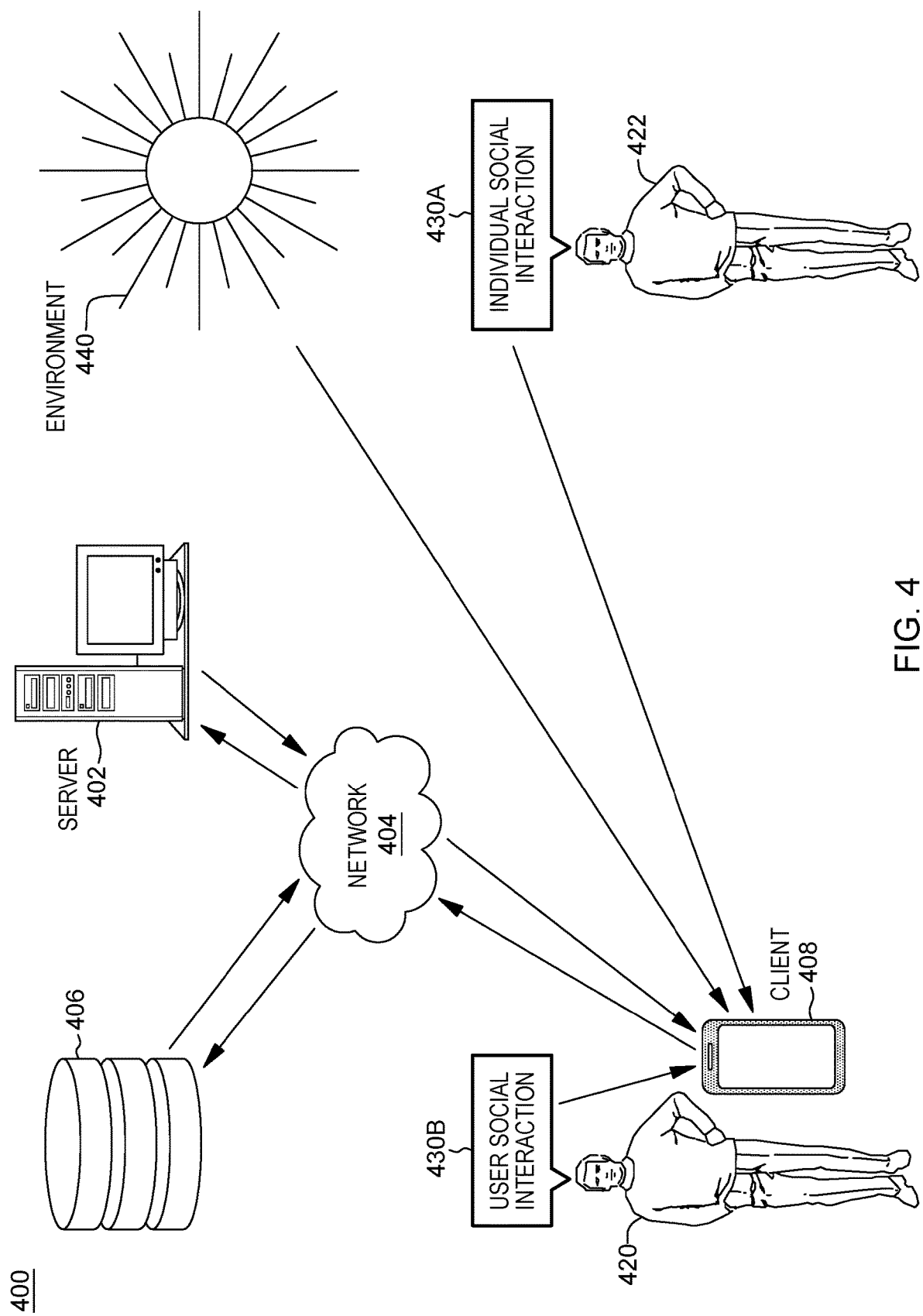
FIG. 4 depicts a technical environment into which aspects of the present invention have been implemented.

FIG. 4 is an illustration of various aspects of another technical environment 400 into which aspects of embodiments of the present invention can be implemented. The technical environment 400 can include a computer system 402 responsible for data processing that includes, for example one or more servers executing program code. The program code executing on the computer system 402 can receive data via, for example, network 404 from one or more data sources. According to one embodiment, the one or more data sources can include, for example, one or more databases 406 as well as one or more input devices 408 (i.e., client devices). According to one embodiment, the computer system 402 can process data of elements in a user's 420 vicinity that are monitored (with permission), via one or more input devices 408. For example, to monitor a vicinity of a user, the program code can detect via, for example, an image/video capturing component and/or an audio capturing component, images, video and/or audio of one or more individuals 422 in the user's 420 vicinity. Further, one or more actions 430A being performed by the one or more individuals 422 can also be detected, where the one or more actions 430A can include behaviors (e.g., movements, non-verbal communication, verbal communication, etc.) of the one or more individuals 422. Additionally, according to one or more embodiments, one or more user actions 430B of the user 420 can also be detected by the program code.

The one or more input devices 408 can also detect context elements 440 of the one or more actions 430A, 430B being performed. Further, the program code executed by the computer system 402 can analyze the one or more individuals in the user's vicinity to determine whether the program code can identify the one or more individuals. The program code 402 can also analyze the one or more actions to determine a current circumstance (e.g., is the individual running as part of a physical workout or because the individual is late) of the one or more individuals. The computer system 402 can also analyze context elements 440 of the one or more actions to determine a current environment (e.g., a location, the weather, traffic conditions, etc.) in which the one or more individuals 422 is located. The one or more client devices 408 can include, for example a mobile device such as a phone, laptop, tablet, etc. having a user interface such as a haptic interface and/or a graphical user interface (GUI).

Figure 5:
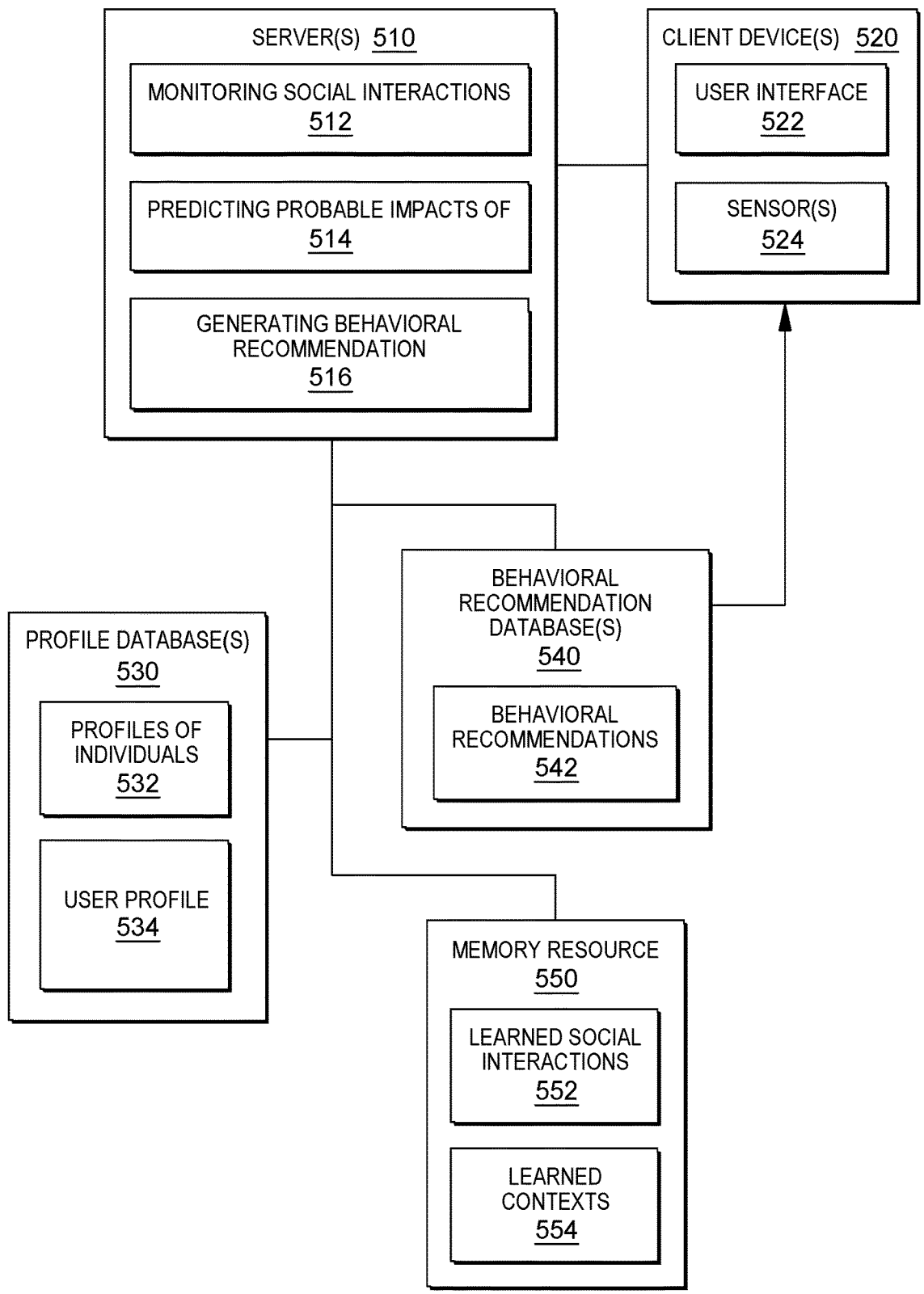
FIG. 5 depicts a technical environment into which aspects of the present invention have been implemented.

FIG. 5 is an illustration of aspects of a technical architecture 500 (e.g., computing infrastructure) into which aspects of the present invention can be implemented. For illustrative purposes only, in FIG. 5, certain functionalities of the program code (executed by one or more processors of at least one server 510) are separated into modules. The program code itself can include one or more modules and the depiction in this figure is provided to assist in comprehension and not to impose any limitations upon the program code. The functionality of the program code is discussed in the context of FIG. 1, so as to illustrate how elements of the technical environment 500 facilitate aspects of the workflow 100.

Referring to FIGS. 1 and 5, program code executing on one or more processors captures an event proximate to an individual that the individual is unable or unavailable to perceive (110) and a client device 520, which can be an IoT device can capture this event. The client device 520 can include a user interface 522, aforementioned as a haptic interface or as a graphical user interface (GUI), generated by the program code. The technical environment 500 shows the applications of the client device 520, such as the user interface 522, as being a client-server application, with the program code that generates the user interface 522 being executed on one or more server(s) 510. However, in some embodiments of the present invention, the user interface 522 can be a thick client and a local processor could execute at least some of the program code that generates the user interface 522.

The event can be the presence of another individual proximate to an individual who does not perceive this other individual. However, beyond just the presence, program code in embodiments of the present invention can also capture a social interaction (or attempted social interaction) as an event. For example, information captured by the one or more sensors 524 can be an action. To interpret this action, the program code can compare the action to learned social interactions 552 stored in a memory resource 550. The actions can include, but are not limited to a wave, a smile, a hand extension for a handshake, a wink, an eye roll, a head nod, an avoidance maneuver, etc. In some embodiments of the present invention, the program code can recommend that the user initiate contact with an individual at a time later than the present. For example, if the program code determines, based on monitoring, that an individual is engaged in an activity, such as reading, and based on past contacts does not respond well to being disturbed, the program code could recommend that the user initiate a contact at a later time. A recommendation to initiate contact at a later time could include, but is not limited to, send an email, make a voice call, send a text message, initiate an in-person conversation in a different venue, etc. The program code can determine how the communication is to be interpreted based on comparing the communication to the learned social interactions 552. Based, at least in part, on interpreting a communication captured via the one or more sensors 524, by correlating the communication with learned social interactions 552, the program code can make a recommendation.

As discussed earlier, certain users who benefit from utilizing aspects of some embodiments of the present invention can select usage of these aspects to assist in social interactions that may or may not be hindered to overcome personal challenges, including but not limited to permanent and/or temporary visual impairment. Thus, the user interface 522 utilized in embodiments of the present invention and the utilities utilized to communicate with the user can be selected based on any special considerations involving the user. For example, while an individual with perception challenges related to social challenges may utilize a GUI, an individual with sight impairment can utilize a user interface 522 that interfaces with the user via haptic feedback and/or voice commands. As discussed in FIG. 1, the program code recommends an action to the individual (130) and thus, depending on the challenges and/or preferences of the user, the manner in which this recommendation is provided via the user interface 522, and/or the type of user interface 522, can be personalized to the user.

As discussed in FIG. 1, the program code determines a (probable) impact of the event on the individual (120). A given event and a prediction related to the event, by the program code, can vary based on the context of the event. Aspects of various embodiments of the present invention can assist the program code in contextualizing the event and therefore, in determining the impact. For example, in some embodiments of the present invention, based on the information collected by the one or more sensors 524 being classified as contextual information, the program code can determine whether various elements captured by the image, video, and/or audio corresponds to circumstantial attributes saved as learned contexts 554 in a memory resource 550. The program code can determine, for example, why an individual is performing an action at the moment the image, video, and/or audio was captured by a sensor. For example, using the learned contexts 554, the program code can determine that an individual is running because the individual is late or that this individual is running because the individual is working out. Further, the program code can identify a current location (i.e., social/environment setting) of a social interaction such as, for example, whether the context includes a workplace setting, a daily commute, a concert, attendance at a sporting event, using public transportation, a current weather condition, etc. Additionally, the various elements captured by the image, video, and/or audio can be used by the program code to determine events that recently happened using the learned contexts 554. For example, the program code can determine that an individual just missed the bus, that an individual just fell down, that an individual just lost an item, etc. According to one embodiment, the program code can also use the captured image, video, and/or audio as feedback for learning new contexts that can then be stored as learned contexts 554. Based on identifying a context of a social interaction captured via the one or more sensors 524 by correlating the context of the social interaction with a learned context of the learned contexts 554, the program code of the probable impacts module 514, can use the context of the social interaction to predict probable impacts.

In some embodiments of the present invention, the program code generates a temporal profile of the individual that includes the action and the context. This temporal profile, or comprehensive composite profile can be used, according to various embodiments, by the program code to predict probable impacts.

From the probable impacts, which can be a plurality of predictions based on determining probable impacts that various actions will have on the user and/or one or more individuals in the user's vicinity, the program code generates, using the generating behavioral recommendation module 516, a behavioral recommendation. The behavioral recommendation generated can be selected, for example, from various behavioral recommendations 542 of one or more behavioral recommendation databases 540. For example, the behavioral recommendation selected can be selected based on determining that the behavioral recommendation will provide a beneficial psychological impact to the user. According to one embodiment, the behavioral recommendation is generated, for example, based on ranking the probable impacts to identify a probable impact that will provide a best beneficial psychological impact.

Returning to FIG. 5, the program code (executing in this non-limiting example) on one or more servers 510 communicatively coupled to the client device 520, to determine the impact of the event captured, in this example, by the client device 520 (e.g., via the sensors 524), utilizes various data, including historical social interactions 512 with individuals proximate to the user and the user (monitored by the program code with the permission of the individuals and/or user). The program code executing on the server(s) 510, in this example, is separated into program code that monitors social interactions 512, including before and after a recommendation is made by the program code, program code that predicts the impacts of actions 514, and program code that generates the recommendation 515. In generating the recommendation 514, the program code can access (and utilize in its analysis), a profile of the user 534 and/or profiles of individuals 532 within the vicinity of the user. In this example, the user profiles are maintained by the program code on a profile database 530.

As aforementioned, prior to making a recommendation, the program code in embodiments of the present invention, identifies one or more individuals within a vicinity of a user. As illustrated in FIG. 5, the user profile 534 of the user as well as the profiles of the individuals 532 are utilized by the program code in some embodiments of the present invention when generating a recommendation 514. In some embodiments of the present invention, a user profile of the user and/or the individual(s) can includes elements of a digital wardrobe of the user or the individual (and/or of groups these individuals are a part of). The program code can generate a user profile, initially, by cognitively analyzing the digital wardrobe of a user/individual. As understood by one of skill in the art, a digital wardrobe is a collection of data that can be understood as a unique identifier for a user (individual or group). A user's digital wardrobe is comprised of all hardware and software that a user interacts with. For example, not only is a user's digital wardrobe comprised of all physical computing devices a user may utilize (e.g., personal computing device, Internet of Things devices, sensors, personal health trackers, physical activity trackers, smart watches, digital thermostat, smart televisions, digital cameras, computerized exercise equipment, smart appliances, the client device 520, etc.), it is also comprised of any software a user utilizes (e.g., social media platforms, ecommerce applications, electronic media subscriptions, electronic media views, etc.), including those utilized with the client device 520. Because of the variety of devices and applications available, those of skill in the art accept that two individuals will not have the same digital wardrobe. Thus, an individual's digital wardrobe can be utilized as a unique identifier for the individual. In addition to identifying a user, data that comprises a digital wardrobe can be utilized to tailor additional applications, software, events, experiences, to fit the parameters and preferences to the user, based on extracting and analyzing this data from the user's digital wardrobe. In embodiments of the present invention, the program code can extract elements of a user's digital wardrobe to generate portions of the profiles of the user and of the individuals.

Elements of a digital wardrobe for a given user of a client device 520 can be accessed by the server(s) 520, via the client 520, via communications with IoT devices (including in the case where the client device 520 is an IoT device). Because the smart sensors in IoT devices carry unique identifiers (e.g., sensors 524), a computing system that communicates with a given sensor 524 (e.g., a personal computing device, the client 520) can identify the source of the information. Within the IoT, various devices can communicate with each other and can access data from sources available over various communication networks, including the Internet. Thus, based on communicating with the client device 520, program code executing on the server 510 can obtain digital wardrobe data from the client 520, to configure the user profile 534 and retain the user profile 534 in a profile database 530.

The program code can also determine a (probable) impact of the event on the individual (120) at least in part, by utilizing an existing cognitive agent in order to perform analyses that predict probable impacts of the event 514 and generate the behavioral recommendation 516 for the user. As will be discussed herein, various data relevant to a user (current and past conversations with the user and third parties, social media posts, exhibited physical behavior, third party opinions, etc.), which can be obtained by the program code, can be analyzed by the program code for what is described herein as core values (e.g., based on keywords, pre-existing classifications of opinions, etc.) can be analyzed by the program code by utilizing a cognitive agent. The program code can use these analysis to build a memory resource 550 of learned social interactions 552 and learned contexts 554. For example, in some embodiments of the present invention, the program code can utilize an existing cognitive agent to determine the subject of a conversation (or isolated communication), determine the subject(s) of the conversation/communication, and determine whether the subject(s) is relevant to a pre-defined set of core values. One such cognitive agent that can be utilized in embodiments of the present invention is IBM Watson®. For example, in some embodiments of the present invention, the program code interfaces with the application programming interfaces (APIs) that are part of a known cognitive agent, such as the IBM Watson® Application Program Interface (API), a product of International Business Machines Corporation, to identify a subject and/or context of an oral communication and/or written communication (e.g., conversation, social media post, etc.). To analyze a communication, for example, three APIs that can be utilized in embodiments of the present invention include, but are not limited to IBM Watson® Natural Language Classifier (NLC), IBM Watson® Natural Language Understanding, and IBM Watson® Tone Analyzer. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine/agent or not.

In some embodiments of the present invention, the cognitive natural language processing (NLP) capabilities of the program code are implemented as a machine learning system that includes a neural network (NN). In certain embodiments of the present invention the program code utilizes supervised, semi-supervised, or unsupervised deep learning through a single- or multi-layer NN to correlate various attributes from unstructured and structured data related to a user and individuals within a physical vicinity of the user (e.g., gathered by the program code from personal computer devices, which can include Internet of Things (IoT) devices). The program code utilizes resources of the NN to identify and weight connections from the attribute sets in the audio to determine the context of the conversation(s) and whether the conversation(s) are relevant to the core values. For example, the NN can identify certain keywords that indicate a relevant to the core values.

As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing (NLP). Thus, by utilizing an NN the program code can identify attributes and classify these attributes as relevant to a various core values of the user and/or individuals within a physical vicinity of the user.

As depicted in FIG. 1, the program code tracks the impacts of the recommended action, if facilitated by the individual, based on the recommendation (140) and utilizes the data related to the impacts to update logic related to future recommendations (150). Hence, returning to FIG. 5, in addition to collecting explicit feedback from users, via the user interface 522, the program code also generates implicit feedback based on detecting, via one or more sensors 524, which the user implemented or did not implement the behavior recommended by the program code of behavioral recommendation 542 module. For example, in embodiments of the present invention where program code captured audio (with permission) via the one or more sensors 524, the program code can make a determination that the user initiated a conversation based on the behavioral recommendation 542, which included a recommendation to initiate a conversation. According to various embodiments of the present invention, the program code can analyze images and/or video captured by the one or more sensors 524 and utilize this data to make the determination regarding whether the user initiated the conversation. Specifically, the program code can analyze these images and/or videos to determine whether they include, for example, individuals, the surrounding environment, facial expressions, eye movement, body language, location of individuals relative to the user, etc. Based on the data from the one or more sensors 524 including an image and/or video, the program code can perform, for example, facial recognition to identify individuals and action recognition to identify actions being taken by these individuals. (In some embodiments of the present invention, the one or more sensors 524 are communicatively coupled and/or executing on the one or more client devices 520.)

In some embodiments of the present invention, the program code can utilize existing recognition methods to determine whether the user initiated the recommended conversation and to track and categorize data from the conversation. As one non-limiting example, the program code can utilize IBM Watson® Visual Recognition to detect for specific content. The program code of the present invention interprets audio, image, video, and/or other data obtained by the one or more sensors 524. This program code is illustrated in FIG. 5 as a monitoring social interactions module 512, which is executed by one or more processors of at least one server 510. The program code of the monitoring social interactions module 512 collects information from the one or more sensors 524 and can perform, for example, conversion analysis to convert images, video and/or audio to text using a speech to text algorithm. The text can then be classified as including identifying information to be used to identify one or more individuals, as including an action (e.g., a communication) performed by the one or more individuals, and as including context information to be used to ascertain a context of the actions performed by the one or more individuals. Once categorized, the program code can perform various functions depending on how the information is classified.

Based on the program code classifying information as identifying information, the program code can further determine whether the identifying information corresponds to an individual for whom a profile has been generated and stored in one or more profile databases 530 that store profiles of individuals 532. According to one embodiment, the program code can, for example, perform facial identification an image of an individual captured by the one or more sensors 524 and determine whether the facial features of the individual correspond to facial features of an individual stored in one or more profile databases 530. The program code can, for example, perform voice recognition to compare a voice of an individual captured by the one or more sensors 524 to voices of individuals whose profiles are stored in one or more profile databases 530. According to one embodiment, based on determining that, for example, the image, video, or audio does not correspond to any profiles of the profiles of individuals 532, the program code generates a new profile for the individual based on this data. Alternatively, based on determining that, for example, the image, video, and/or audio does correspond to a saved profile of the profiles of individuals 532, the program code can identify the individual use information saved in the profile of the individual and updated this information such that the updated information can be utilized by the program code in future predictions.

In embodiments of the present invention, when the program code recommends an action to the individual (FIG. 1, 130), based on probable impacts, the program code, when recommending that the individual initiate a conversation or contact with another individual, has determined that there is value in having this conversation or contact. In some embodiments of the present invention, the program code evaluates particular values of the individual and the prospective conversation partner in order to determine whether this conversation would have value and hence, whether to recommend initiating a conversation. Below is a non-exclusive list of certain values that the program code evaluates in embodiments of the present invention:

Justice/Injustice
Trust/Mistrust
True/Untrue
Belief/Absence of Belief
Gain/Loss
Ethical/Unethical
Interesting/Uninteresting
Secure/Insecure Information that at least partially be gained from visual cues can often enable an individual to make value judgments about another individual, a subject, which could lead that first individual to decide to initiate or not to initiate a conversation with the subject. This information can include, but is not limited to: 1) opinions expressed in past conversations with the subject (e.g., when a conversation happened with the subject in the past, the subject always expressed a negative characterization and a disagreement with the government's economic policies); 2) opinions expressed in social media by the subject (e.g., support for an organization engaging in certain activities which the subject views as unethical); 3) any activities by the subject visible to the other individual, that can form a perceived value (e.g., the subject interacted negatively with an individual who appeared to be in need of assistance); 4) opinions highlighted by a third party about the subject (e.g., the subject participated in an activity for personal financial game at the expense of another entity). Returning to the example of an individual who cannot perceive visual cues, due to challenges related to perception, including but not limited to compromised eyesight, this individual may miss certain data that could be utilized to perform a core value perception about the subject. This individual can potentially miss information used in these judgments by not perceiving the subject or other individuals that interact with the subject (e.g., in a public place).

Figure 6:
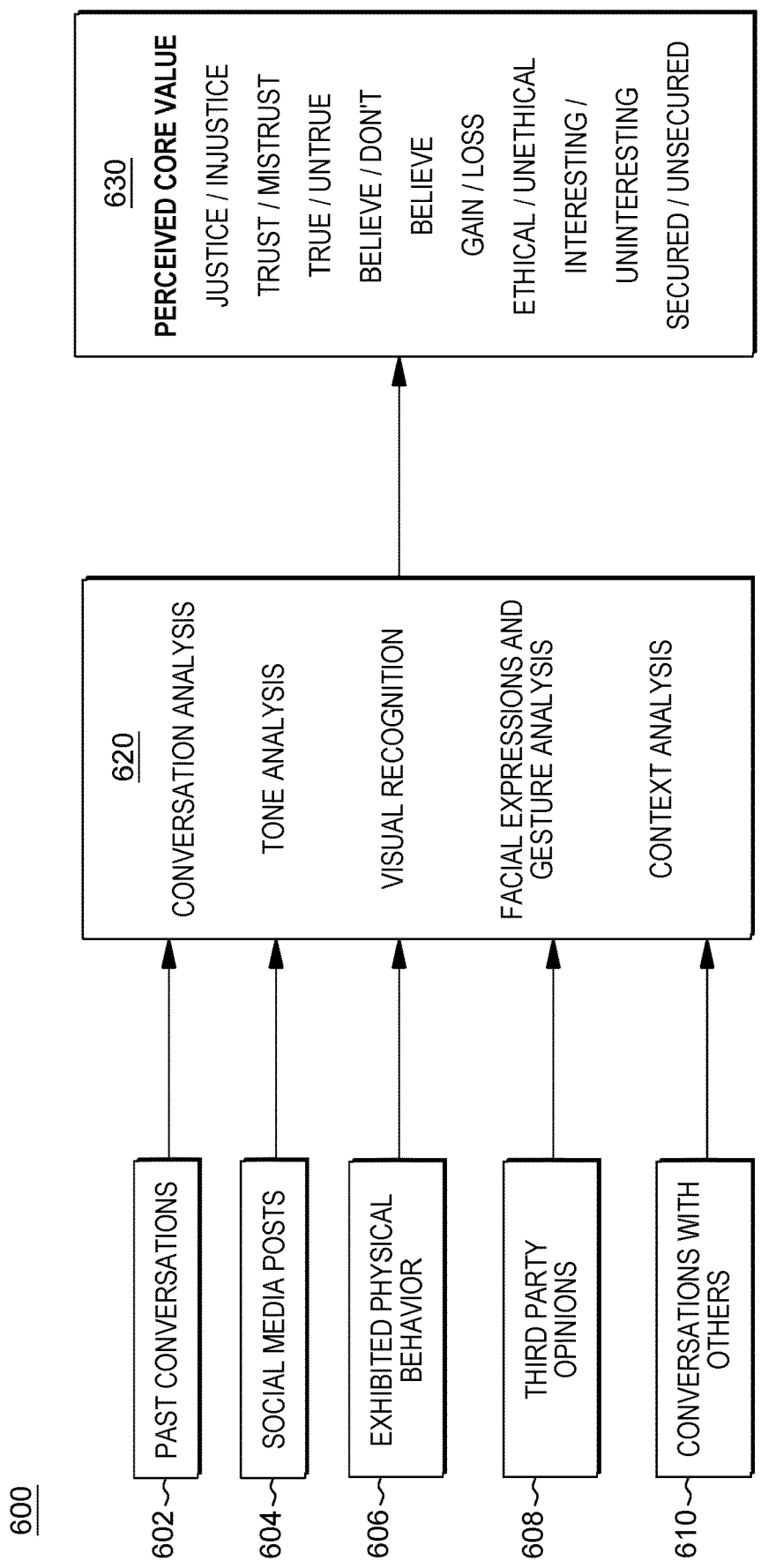
FIG. 6 is a block diagram that depicts how the program code in some embodiments of the present invention evaluates core values of a subject.
Figure 7:
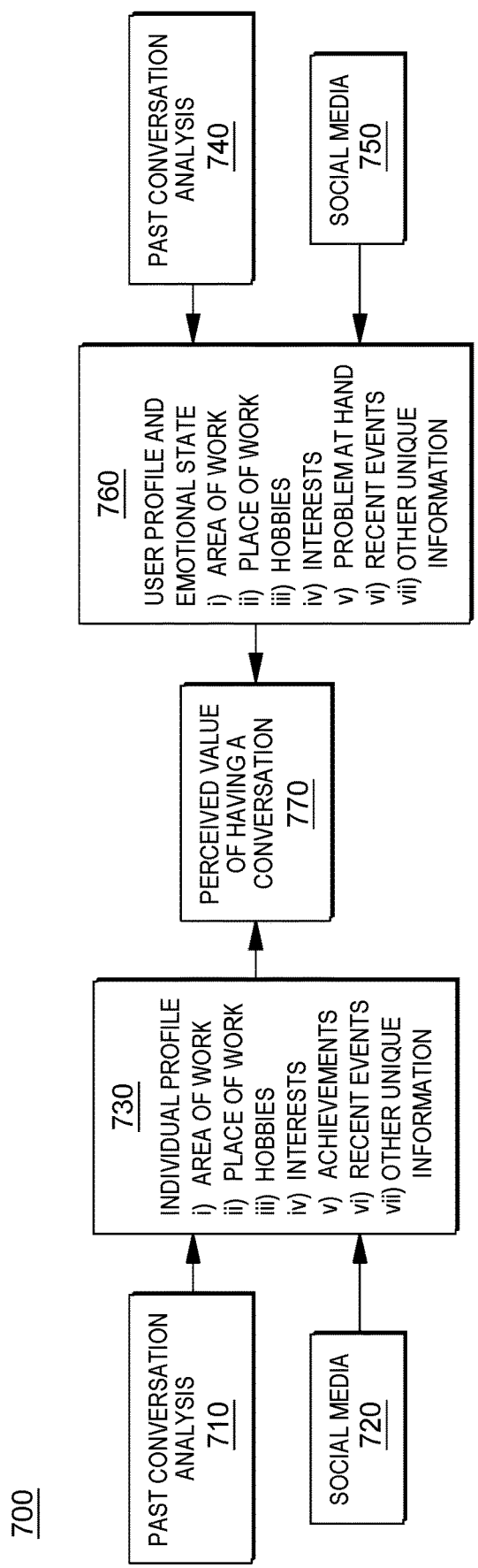
FIG. 7 s a block diagram that depicts how the program code in some embodiments of the present invention evaluates non-core values of a subject.

Referring back to FIG. 2, the program code can utilize a classifier 250 to classify the individual based on what the program code determined are the perceived core and non-core values of the individual (explained in greater detail herein). FIG. 6 depicts a core values analysis while FIG. 7 depicts a non-core values analysis. Both of these analyses enable the program code to predict whether a conversation between the individual and the subject is likely to be positive.

FIG. 6 is a block diagram that depicts how the program code in some embodiments of the present invention evaluates the core values of a subject in order to determine core values of the subject, which the program code than utilizes to determine whether a conversation between the individual and the subject would be productive/positive/useful. As discussed earlier, in embodiments of the present invention, program code first identifies the subject and based on this identification, obtains additional information. Thus, once the subject is identified by the program code (e.g., based on a recognition program, a digital wardrobe, a device, etc.) the program code obtains various inputs corresponding to the individual, including but not limited to, past conversations 602 between the user and the individual, social media posts 604 posted by the individual, physical behavior exhibited 606 by the individual, third party opinions 608 about the individual, and conversations the individual has had with others 610. The program code performed various analyses on this data 620, in order to identify 630, core values of the individual. As the data inputs are varied, the program code can employ different types of analyses to extract the content of the inputs and correlate this content with values. As aforementioned, embodiments of the present invention aid a user in decision-making related to initiating contacts and/or conversations with other individuals (subjects) based on the program code determining shared and/or compatible values of the user and one or more subjects. As explained herein, the program code continually perceives and updates the values of the individuals within a vicinity in order to recommend contacts to the user, based on correlations of values. The analyzing by the program code can include, for example, conversation analysis, tone analysis, visual recognition, facial expression and gesture analysis, and context analysis. As discussed herein, to determine the values of various individuals, program code in embodiments of the present invention, captures a) expressed opinions in social media by the users and b) correlated values of bodily parameters measured from the users in the event of knowledge about particular event related to the subject.

As illustrated in the example in FIG. 6, the program code categorizes the analyzed inputs into perceived core values 630. In this categorization, the program code can apply a profile building model that can be trained to determine core values of the subject, and the profile building model can be trained using a profile building algorithm that uses data assigned to the subject based on the various inputs. The example categories, which were referred to above, are also provided in Table A: justice/injustice (J), trust/mistrust (T), true/untrue (Tr), believe/do not believe (B), gain/loss (G), ethical/unethical (E), interesting/uninteresting (I), and secure/insecure (S). These categories are provided herein as example core values, for illustrative purposes, only.

The profile building model can include a weight (a1) that can correspond to all positive values and a same weight of opposite polarity (−a1) that can correspond to all negative values. When no inputs have been obtained, the profile building model can have a default perception that of a positive core value (i.e., the core value has a corresponding positive sign). The default of the perceived value (Pv) can be represented, for example, by: Pv=a1*J+a1*T+a1*Tr+a1*B+a1*G+a1*E+a1*I+a1*S. The program code assigned weights to the categories for each interaction (I) as either a positive or negative value.

TABLE A

| | Values | | | | | | | | | | | | | | | |
|---|---|---|---|---|---|---|---|---|---|---|---|---|---|---|---|---|
| | J | | T | | Tr | | B | | G | | E | | I | | S | |
| | | | | | | | Polarity Weight | | | | | | | | | |
| | a1 | −a1 | a1 | −a1 | a1 | −a1 | a1 | −a1 | a1 | −a1 | a1 | −a1 | a1 | −a1 | a1 | −a1 |
| I-1 | 1 | 0 | 0 | 1 | 0 | 0 | 0 | 0 | 0 | 0 | 0 | 0 | 1 | 0 | 0 | 0 |
| I-2 | 0 | 1 | 0 | 0 | 0 | 0 | 0 | 1 | 0 | 0 | 1 | 0 | 1 | 0 | 0 | 0 |
| I-3 | | | | | | | | | | | | | | | | |
| ... | | | | | | | | | | | | | | | | |
| ... | | | | | | | | | | | | | | | | |
| I-n | | | | | | | | | | | | | | | | |

Further, as more interactions (I) are obtained, other parameters, including how recent and frequency, can be accounted for by the profile building model. How recent a particular interaction was and how frequent this type of interaction was become more important to the program code in determining the core values as the number of interactions increase. An example of accounting for frequency (but not how recent), where 'n' is a weight indicative of frequency (e.g., a higher value for 'n' corresponding to a higher frequency) can be expressed by: Pv=a1*n*J+a1*n*T+a1*n*Tr+a1*n*B+a1*n*G+a1*n*E+a1*n*I+a1*n*S. An example accounting for both frequency and how recent, where 'n' is the weight indicative of frequency and 'k' is a weight indicative of how recent (e.g., a higher value for 'k' corresponding to more recent data) can be expressed by: Pv=a1*(k*n)*J+a1*(k*n)*T+a1*(k*n)*Tr+a1*(k*n)*B+a1*(k*n)*G+a1*(k*n)*E+a1*(k*n)*I+a1*(k*n)*S. Thus, according to one embodiment, the profile building model can derive a perceived value for the individual of each core value and provide more weight to perceived values that occur more frequently and have occurred more recently. The program code, using this model, will derive each perceived value and the total perceived value by providing higher weights for values that have been exhibited a higher number of times, and more recently.

In addition to FIG. 7 depicts the evaluation by the program code of non-core values to determine whether a conversation/interaction between an individual and a subject would be positive. In this example, a user is an entity that is receiving a recommendation from the program code and the individual is the subject that is being evaluated by the program code for interaction with the user. FIG. 7 is a workflow that depicts various aspects of this analysis by the program code. In some embodiments of the present invention, program code obtains data that includes, but is not limited to past conversations 710 of an individual and posts in public social media accounts 720 by the individual, to generate an individual profile 730 of the individual. In order to generate this profile, the program code can utilize APIs of an existing cognitive agent. In some embodiments of the present invention, the program code generate and individual profile 730 for the individual (as well as for the subject) using a classification algorithm that classifies all the information known about the individual, as parsed by the cognitive agent. The individual profile 730 can include, for example, an area of work (e.g., profession, professional field, etc.), a place of work (e.g., company, regional location, office address, etc.), hobbies, interests, achievements, recent events in which the individual has participated, other unique information about the individual, as well as core values derived via, for example, the profile building model.

According to one embodiment, generating the individual profile 730 can be a continuous process as various inputs can be continually obtained, via network connectivity to various resources.

In the same manner as the program code generates a profile for an individual, the program code can generate a profile for a user, in some embodiments of the present invention. The program code in this non-limiting examples analyzes past conversations 740 and the social media accounts 750 of the user to whom the program code provides the behavioral recommendation. A user profile 760 can be generated, for example, using a classification algorithm that classifies all information known about the user. The user profile 760 can include, for example, historical information about the user, as well as a current emotional state of the user. Historical information about the user can include, for example, an area of work, place of work, hobbies, interests, recent events in which the user participated, and other unique information. The current emotional state of the user can include, for example, a current issue that the user hopes to address (e.g., as revealed in social media posts and/or part conversations).

As discussed above, aspects of the present invention can be of particular use to individuals with visual perception challenges. Thus, in order to generate a profile for a user with these challenges, in order for the program code to correlate non-core values and determine whether a conversation outcome is likely positive (based on a threshold determination), aspects of some embodiments of the present invention can assist the program code in obtaining data about the user which the program code analyzes to generate the profile. For example, in some embodiments of the present invention, as discussed above, a user wears an image and audio capture device, which can capture (as data analyzed by the program code to generate a user profile) surroundings of the user and activities being performed by the user, as well as conversations that the user is engaging in with all subjects (in conformance with all local laws and with the consent of the parties, as needed). All data collected and handled by the program code in embodiments of the present invention is collected based on users as well as subjects opting into participation. The program code handles and stores all data discretely and securely, and disposes of any data (if/when it disposes of data) discretely and securely. A user is provided with an option to opt out at any time and data collection and analysis is performed by the program code with the express consent of the user (and the subjects). The program code can utilize an image analysis algorithm to analyze the images and can utilize an algorithm to convert the conversations to text. The program code can utilize a NLP algorithm to extract subjects from the text. Similarly, the program code can analyze the text of social media postings by the user. The program code can apply a classification algorithm to generate attributes that comprise a profile of the user.

Hence, as depicted in FIG. 7, for both an individual and a user, the program code continuously obtains data (audio, video, and text), analyzes the data (utilizing algorithms to extract context and subjects, e.g., based on keywords), and applies a classification algorithm to classifies all this information to generate a user profiles. The generation of the profile for each entity is a continuous process and this, the program code can continuously update profiles based on the latest data available. In the examples, provided, the specific attributes that comprise the entity profiles are provided for illustrative purposes only and do not suggest any limitations. As can be appreciated by one of skill in the art, this model can be generalized, particularized, and/or extended for any type and any number of profile attributes and their values.

Based on this analysis of non-core values, the program code predicts a benefit of performing various actions including, for example, a predicted benefit of the user having a conversation with the individual. In some embodiments of the present invention, based on a pre-determined scale of compatibility (matching of non-core values or attributes of the user profile 760 and the individual profile 730), the program code assigns a value (binary, scale, etc.) to having the conversation. For example, the data obtained by the program code about an individual can indicate that the individual works for a book publishing company, which the program code stores in profile 730. The program code obtains data indicating that the user writes as a hobby (which the program code retains in the user profile 760). The program code determines that these attributes are compatible. In some embodiments of the present invention, the program code can use the data obtained about the user and the individual to perform a sentiment analysis to determine whether these entities would be open to a conversation at a given point in time. The program code can determine these sentiments by using a cognitive agent to analyze blog posts and other communications. For example, if the program code determined that the user was recognized for performing community service to read stories to children and is excited after finding out that a close friend was offered a contract by a book publisher to publish their book, the program code can determine that the perceived value of having a meaningful conversation about books (provided that the user is interested in books), could be high.

Table B provides an example correlation table where values v1, v2, and v3 are assigned based on perceived values in order to facilitate generating the behavioral recommendation. For example, v1 represents a baseline value, v2 indicates a moderate perceived value, and v3 indicates a highest possible perceived value of having a meaningful conversation. The examples in Table B are provided for illustrative purposes only and not to limit non-core values that can be evaluated by the program code.

TABLE B

| | | Individual's Profile | | | | | |
|---|---|---|---|---|---|---|---|
| | | Work for Book Publishing Company | Golfs | Traveled to Mexico Recently | ... | ... | Skis |
| User's Profile | Story Writing Hobby | v2 | v1 | v1 | | | v1 |
| | Excitement for Friend's book contract | v3 | v1 | v1 | ... | ... | v1 |
| | Community Service Recognition | v2 | v1 | v1 | ... | ... | v1 |
| | ... | ... | ... | ... | ... | ... | ... |
| | Skis | v1 | v1 | v1 | ... | ... | v2 |
| | ... | ... | ... | ... | ... | ... | ... |
| | Need for Emotional Connection | v3 | v1 | v1 | ... | ... | v1 |

According to one embodiment, training data can be used to train a matrix on which combinations of attributes are likely to have a high correlation value (e.g., v3), which indicate a high perceived value of having a conversation. Once the matrix is trained for a given individual, the program code can derive the perceived value of having the conversation 770. The perceived value of having the conversation 770 can be included, for example, with other parameters to develop the comprehensive composite profile used by the program code to make a behavioral recommendation. As described herein, the program code can determine a user profile of an individual, which can include, but is not limited to, assessments of core values, assessments of non-core values, behavioral observations, conversational contextualizations, circumstantial attributes, relationships, etc.

As explained earlier, FIG. 8 illustrates the operation of a classification algorithm in embodiments of the present invention. The program code applies the classification algorithm to determine likelihoods of positive or negative outcomes when an individual utilizes aspects of the present invention to determine whether to initiate a conversation with a subject. In one example, the classifications of the algorithm include classes for: 1) High perceived value and positive outcome; 2) High perceived value and negative outcome; 3) Low perceived value and negative outcome; and 4) Low perceived value and positive outcome. In embodiments of the present invention, these values can be relative to each other and/or within predefined quantitative boundaries, based on similarities. In embodiments of the present invention, the program code recommends that a user initiate a conversation with a subject if the program code determines that conditions indicate, based on application of the classification algorithm, a class of a positive outcome.

Figure 8:
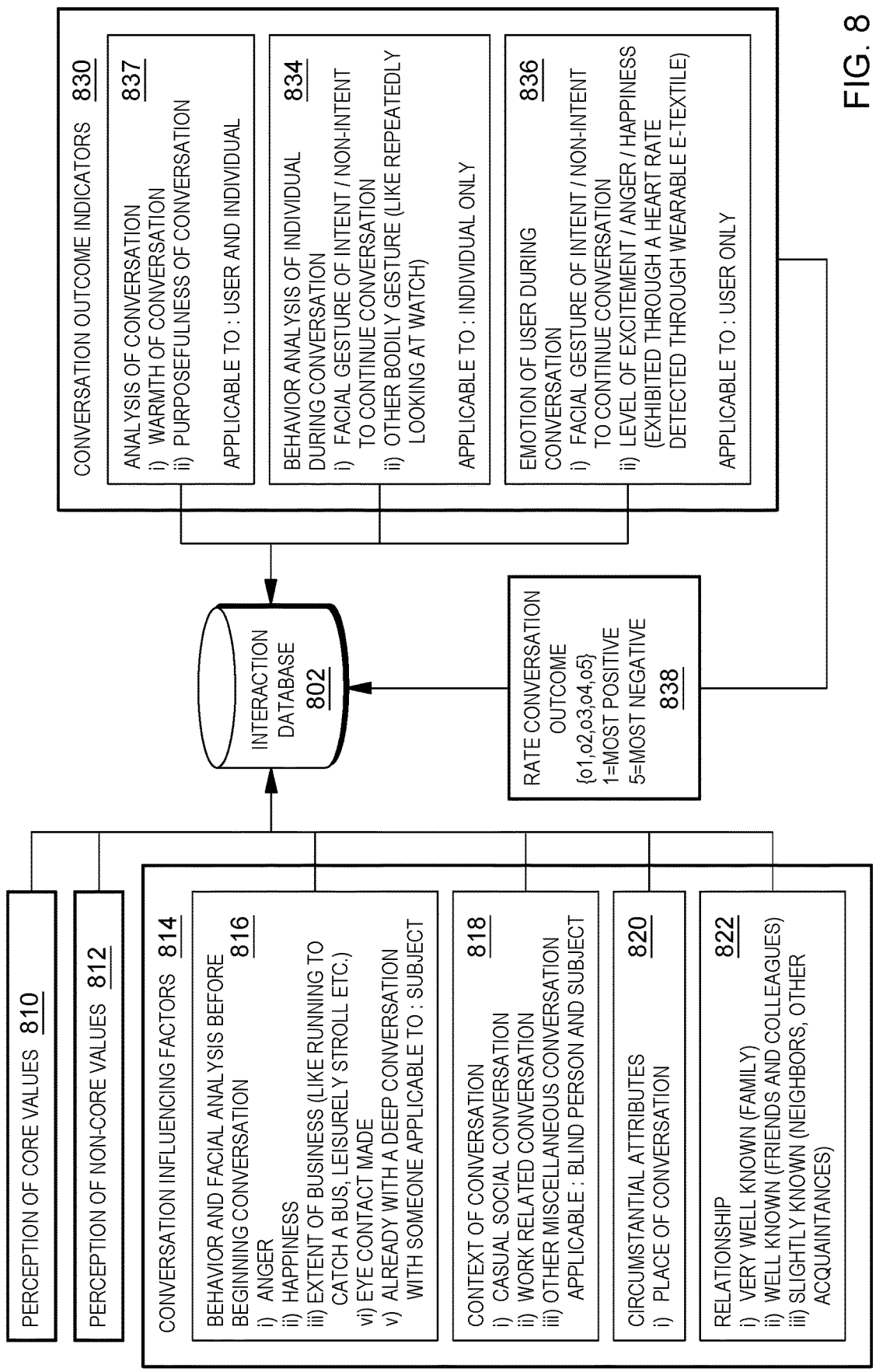
FIG. 8 illustrates the operation of a classification algorithm in embodiments of the present invention.

FIG. 8 illustrates the application, by the program code, of a classifier algorithm, to various types of (aforementioned) data obtained by the program code. The program code collects the data in an interaction database 802. The collected data includes information about a conversation that can be used to modify a perceived value of having the conversation. For example, program code can use a profile of an individual, which includes perceived core values 810, perceived non-core values 812, as well as other conversation influencing factors 814 including, for example, actions performed by the individual 816, context of a social interaction 818, context elements 820, and an existing relationship level 822 to determine whether to initiate a conversation (using the classifier algorithm). Conversation outcome indicators 830 can be used by the program code to analyze the conversation 832 (e.g., determine how the conversation is impacting the user and the individual), analyze behavior of the individual during the conversation 834, and determine an emotional state of the user during the conversation 836. The conversation outcome indicators 830 can be used as feedback to rate a conversation outcome 838 and perform machine learning to modify future behavioral recommendations based on the feedback. In some embodiments of the present invention, the program code captures instances conversations between a user and a subject. Information obtained during a conversation can be used, for example, to provide feedback to update an individual profile and a user profile. Further, program code in embodiments of the present invention, based on continuing to obtain data after making a recommendation, determines whether an actual outcome of a behavioral recommendation corresponds to the predicted outcome and based on the correlation weights, the program code can reassign value for algorithms used to train various prediction models. As understood by one of skill in the art, the program codes perceptions of emotions of a user during a conversation 836 are of particular use when aspects of the present invention are utilized by an individual who cannot perceive the listed elements (e.g., facial gesture, level of excitement, etc.) without the aid of a wearable device based on challenges, including but not limited to, sight impairment.

Figure 9:
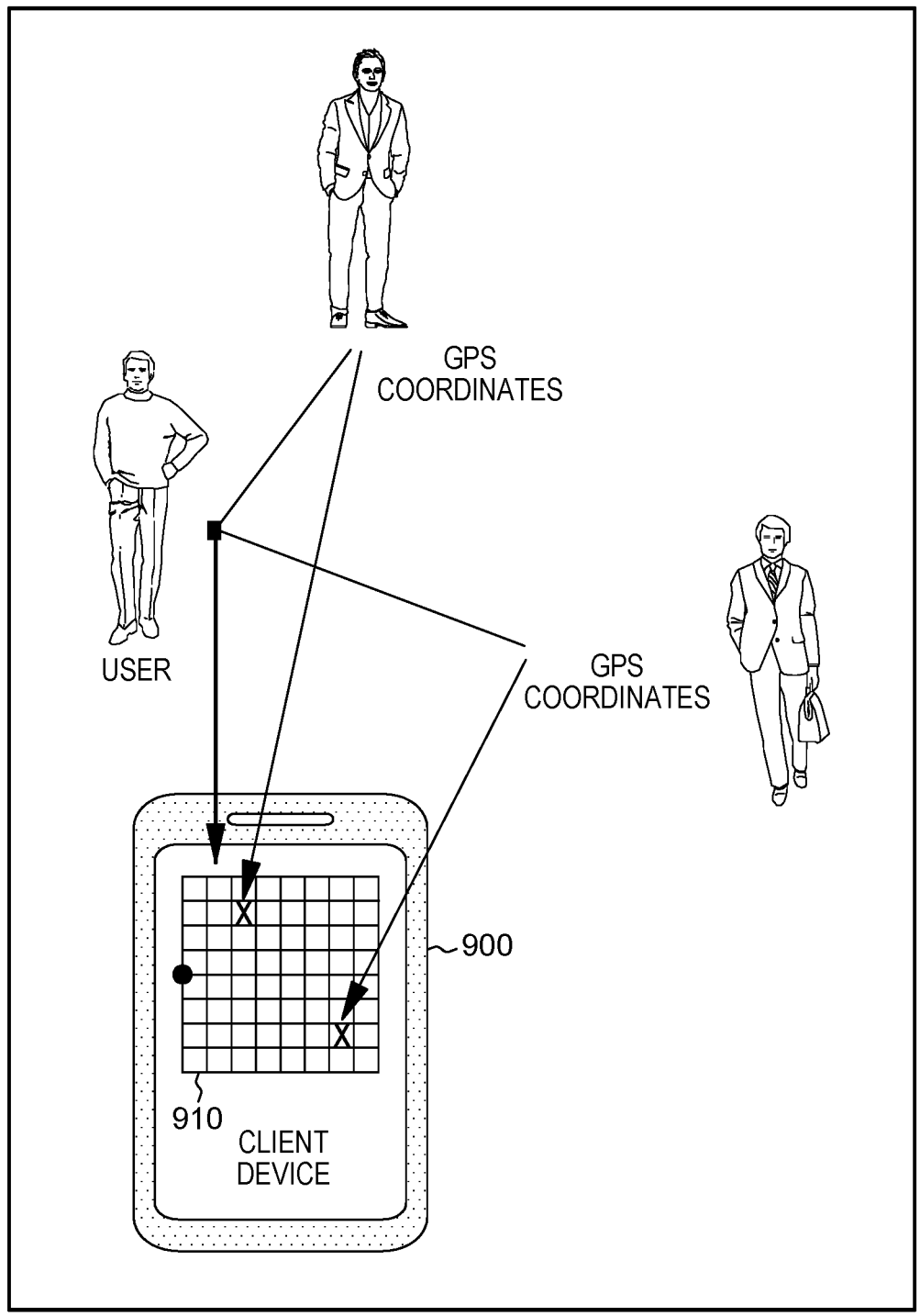
FIG. 9 is an example of an electronic device with a haptic user interface that can be controlled by program code in some embodiments of the present invention.

Returning to FIG. 1, in embodiments of the present invention, during the conversation (as well as contemporaneously with providing a recommendation), the program code can provide inputs into a haptic device to aid the individual in addressing the subject (150). As the user device can be geared toward assisting individuals with perception challenges, FIG. 9 provides an example of an interface generated by the program code in embodiments of the present invention that would assist a user with initiating a conversation as well as with conducting the conversation. Specifically, FIG. 9 is an example of an electronic device 900 with a haptic user interface that is controlled by the program code, in some embodiments of the present invention. In this non-limiting example, the haptic user interface can include various squares 910, each square corresponding, for example, to global positioning coordinates. A direction-finding haptic algorithm is used to map, via the various squares 910, positions of one or more individuals in the user's vicinity relative to a current position of the user. Thus, a user can touch the haptic user interface and determine an approximate location of an individual in the user's vicinity.

Embodiments of the present invention include a computer-implemented method, a computer program product, and a computer system where program code executing on one or more processors obtains, based on monitoring a defined vicinity of a user, via one or more input devices communicatively coupled to the one or more processors, the one or more input devices comprising an audio capture device and an image capture device, environmental data comprising captured audio data and captured image data. The program code generates, based on the environmental data, a user profile for the user, where generating the user profile comprises cognitively analyzing the environmental data to perform a binary valuation of one or more pre-defined core attributes. The program code identifies, based on the environmental data, one or more entities within the vicinity of the user. Based on the identifying, the program code generates, based on the environmental data, a subject profile for each entity of the one or more entities, where generating the subject profile, for each entity of the one or more entities, comprises cognitively analyzing the environmental data to perform the binary valuation of the one or more pre-defined core attributes. The program code predicts, based on applying a classifier algorithm to the user profile and each subject profile, a classification representing a perceived positive or negative outcome of the user initiating a contact with each entity of the one or more entities. Based on predicting a positive outcome for at the user initiating the contact with at least one entity of the one or more entities, the program generates a recommendation to initiate the contact with the at least one entity. The program code transmits, to the user, via a haptic interface of the one or more input devices, the recommendation to initiate the contact with the at least one entity, wherein the haptic interface indicates a location of the at least one entity, relative to the user, within the vicinity.

In some embodiments of the present invention, the pre-defined core attributes comprise a value system, and the binary valuation of one or more pre-defined core attributes is from a perspective of the user, as perceived by cognitively analyzing environmental data within the defined vicinity of the user, obtained by the one or more input devices, and the one or more input devices comprise at least one a wearable device worn by the user.

In some embodiments of the present invention, the program code cognitively analyzing the environmental data further comprises: the program code analyzing the environmental data, utilizing a natural language processing algorithm and an image recognition algorithm, to identify personal attributes in the environmental data and to associate one or more of the identified personal attributes with the user and each entity of the one or more entities, where the one or more personal attributes associated with the user comprise the user profile, and where the one or more personal attributes associated with each entity of the one or more entities comprises the subject profile of the entity.

In some embodiments of the present invention, the program code obtains, based on the identifying, historical data describing conversations between each entity of the one or more entities and the user, where the predicting by the program code further comprises: the program code adjusting the perceived positive or negative outcome of the user initiating the contact with each entity of the one or more entities, based on the historical data.

In some embodiments of the present invention, the at least one entity comprises two or more entities, the program code generating the recommendation further comprises: the program code determining, based on cognitively analyzing the environmental data, an immediate need of the user; the program code prioritizing, the two or more entities such that an entity of the two or more entities with a highest probability of meeting the need of the user is assigned a highest priority, where the program code prioritizing is based on the program code comparing the one or more personal attributes associated with each entity of the two or more entities with the need and correlating the one or more personal attributes with the need, where the entity of the two or more entities with the highest probability of meeting the need of the user is the entity of the two or more entities with one or more attributes that correlate most closely with the need; and the program code generating the recommendation, wherein the recommendation identifies the entity of the two or more entities with the highest probability of meeting the need of the user.

In some embodiments of the present invention, the immediate need of the user was obtained by the one or more processors and identified based on the cognitive analysis.

In some embodiments of the present invention, the program code prioritizing further comprises the program code applying a prioritization algorithm.

In some embodiments of the present invention, the program code obtains a response comprising an acceptance or a rejection of the recommendation. The program code automatically updates the user profile and at least one subject profile based on the response.

In some embodiments of the present invention, the one or more pre-defined core attributes are selected from the group consisting of: justice or injustice, trust or mistrust, true or untrue, belief or absence of belief, gain or loss, ethical or unethical, interesting or uninteresting, and secure or insecure.

In some embodiments of the present invention, the program code identifying the one or more entities within the vicinity of the user further comprises, for each entity: the program code extracting, from the environmental data, at least one facial image of the entity, and the program code utilizing a facial recognition program to identify the entity.

In some embodiments of the present invention, the program code identifies the one or more entities, queries, one or more publicly available computing resource to obtain social media postings by the one or more entities. The program code cognitively analyzes the obtained social media postings to identify additional personal attributes in the environmental data and to associate one or more of the identified additional personal attributes with each entity of the one or more entities, where the one or more additional personal attributes associated with each entity of the one or more entities comprises the subject profile of the entity.

Referring now to FIG. 10, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more profile databases 230 (FIG. 2), one or more behavioral recommendation databases 240 (FIG. 2), and/or the at least one server 210 (FIG. 2) can each comprise a cloud computing node 10 (FIG. 10) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
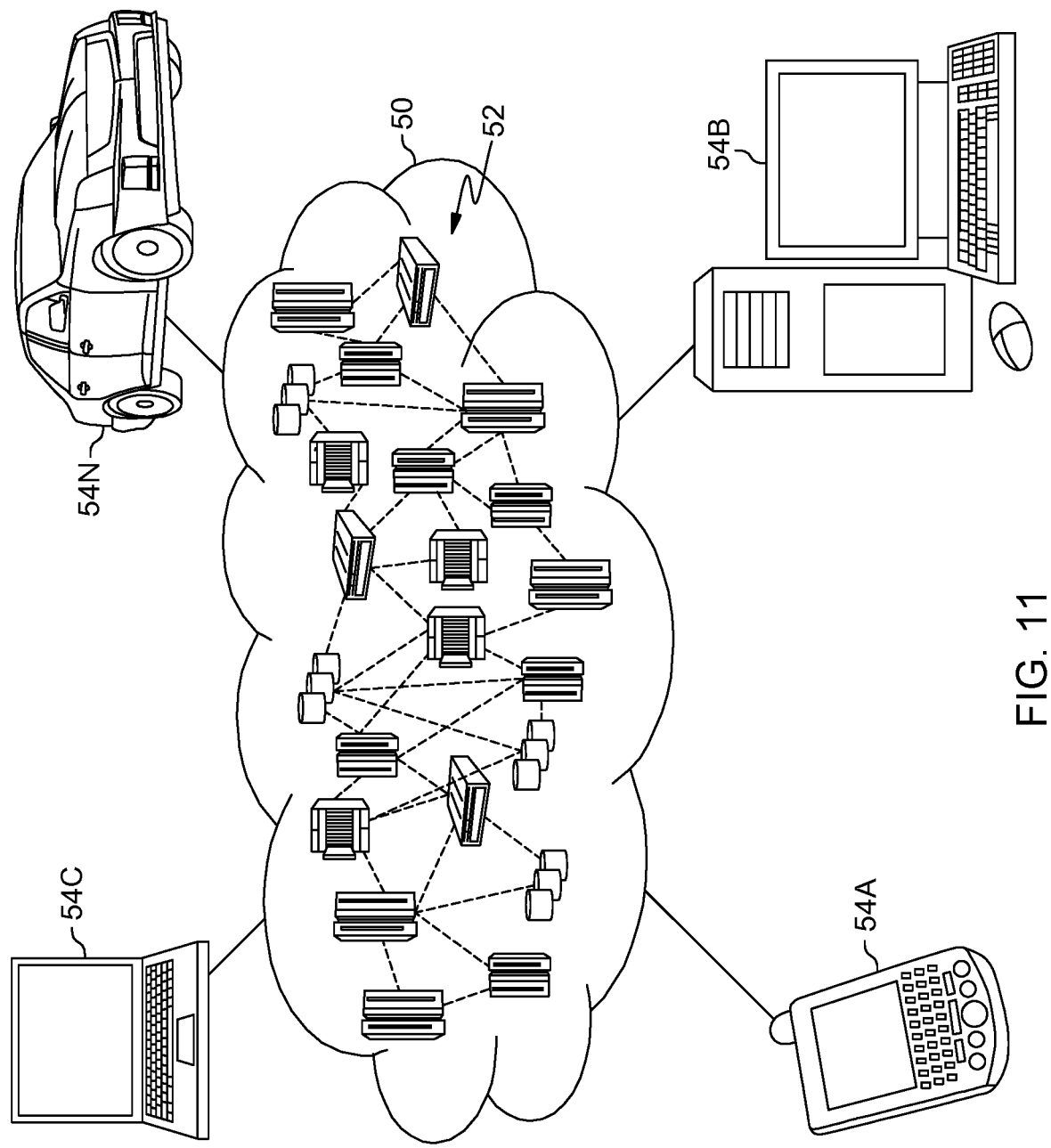
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
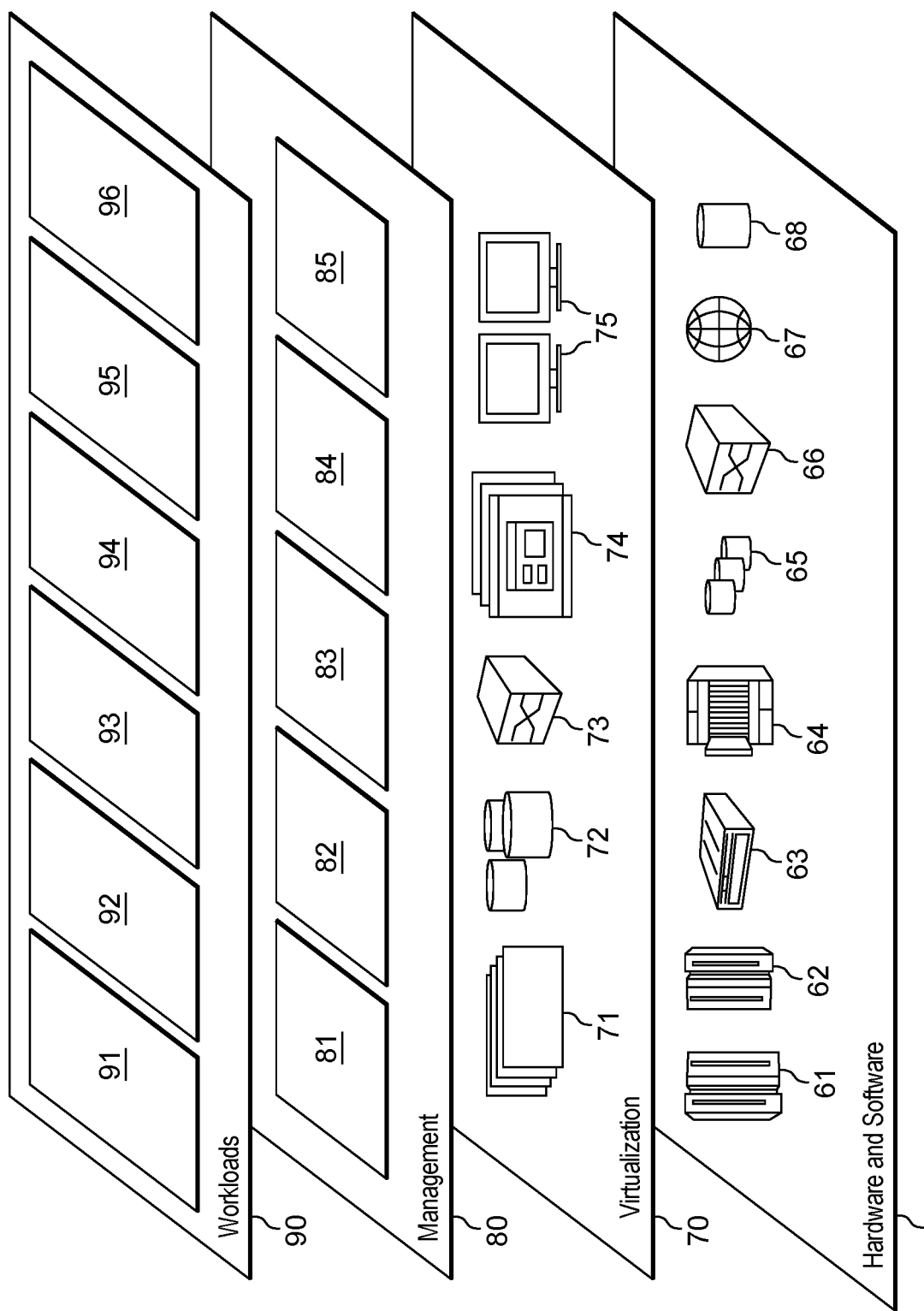
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring and analyzing social interactions to generate a behavioral recommendation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors, based on monitoring a defined vicinity of a user when the user is in a given public space, via one or more input devices communicatively coupled to the one or more processors, the one or more input devices comprising an audio capture device and an image capture device, environmental data comprising captured audio data and captured image data;
obtaining, by the one or more processors, a user profile for the user, wherein the user profile comprises a prioritization of core attributes selected from the group consisting of: hierarchy, physiological, safety, love and belonging, esteem, and self-actualization;
identifying, by the one or more processors, based on the environmental data, one or more entities within the vicinity of the user;
based on the identifying, obtaining, by the one or more processors, a subject profile for each entity of the one or more entities, wherein the subject profile comprises a prioritization of the one or more pre-defined core attributes;
obtaining, based on the identifying, historical data describing conversations between each entity of the one or more entities and the user and based on the monitoring of the defined vicinity, circumstantial attributes comprising one or more activities each entity of the one or more entities is presently engaged in in the given public space;
predicting, by the one or more processors, a classification representing a perceived positive or negative outcome of the user initiating a contact with each entity of the one or more entities, wherein the predicting comprises:
applying a classifier algorithm to the user profile each subject profile, a classification representing a perceived positive or negative outcome of the user initiating a contact with each entity of the one or more entities, wherein the classifier algorithm applies a hypothesis generated utilizing a machine learning model trained with historical information to identify features in past positive interactions; and adjusting, by the one or more processors, the perceived positive or negative outcome of the user initiating the contact with each entity of the one or more entities, based on the historical data and the circumstantial attributes;

based on predicting a positive outcome for at the user initiating the contact with at least one entity of the one or more entities, generating, by the one or more processors, a recommendation to initiate the contact with the at least one entity; and transmitting, by the one or more processors, to the user, via a haptic interface of the one or more input devices, the recommendation to initiate the contact with the at least one entity at a given moment in time, wherein the haptic interface indicates a location of the at least one entity, relative to the user, within the vicinity in the public space, and a direction at which to initiate the contact.

2. The computer-implemented method of claim 1, wherein the one or more input devices communicatively coupled to the one or more processors comprise at least one wearable device worn by the user, wherein the environmental data within the defined vicinity of the user comprises expressed opinions in social media by the user and correlated values of bodily parameters measured from the user in an event of knowledge about particular event related to the subject.

3. The computer-implemented method of claim 1, further comprising:
obtaining, by the one or more processors, via the interface, a response comprising an acceptance or a rejection of the recommendation.

4. The computer-implemented method of claim 1, wherein identifying the one or more entities within the vicinity of the user further comprises, for each entity:
extracting, by the one or more processors, from the environmental data, at least one facial image of the entity; and
utilizing, by the one or more processors, a facial recognition program to identify the entity.

5. The computer-implemented method of claim 1, wherein the one or more input devices communicatively coupled to the one or more processors comprise at least one wearable device worn by the user.

6. A computer program product comprising:
a computer readable storage medium readable by one or more processors of a shared computing environment and storing instructions for execution by the one or more processors for performing a method comprising:
obtaining, by the one or more processors, based on monitoring a defined vicinity of a user when the user is in a given public space, via one or more input devices communicatively coupled to the one or more processors, the one or more input devices comprising an audio capture device and an image capture device, environmental data comprising captured audio data and captured image data;
obtaining, by the one or more processors, a user profile for the user, wherein the user profile comprises a prioritization of core attributes selected from the group consisting of: hierarchy, physiological, safety, love and belonging, esteem, and self-actualization;
identifying, by the one or more processors, based on the environmental data, one or more entities within the vicinity of the user;
based on the identifying, obtaining, by the one or more processors, a subject profile for each entity of the one or more entities, wherein the subject profile comprises a prioritization of the one or more pre-defined core attributes;
obtaining, based on the identifying, historical data describing conversations between each entity of the one or more entities and the user and based on the monitoring of the defined vicinity, circumstantial attributes comprising one or more activities each entity of the one or more entities is presently engaged in in the given public space;
predicting, by the one or more processors, a classification representing a perceived positive or negative outcome of the user initiating a contact with each entity of the one or more entities, wherein the predicting comprises:
applying a classifier algorithm to the user profile each subject profile, a classification representing a perceived positive or negative outcome of the user initiating a contact with each entity of the one or more entities, wherein the classifier algorithm applies a hypothesis generated utilizing a machine learning model trained with historical information to identify features in past positive interactions; and
adjusting, by the one or more processors, the perceived positive or negative outcome of the user initiating the contact with each entity of the one or more entities, based on the historical data and the circumstantial attributes;
based on predicting a positive outcome for at the user initiating the contact with at least one entity of the one or more entities, generating, by the one or more processors, a recommendation to initiate the contact with the at least one entity; and
transmitting, by the one or more processors, to the user, via a haptic interface of the one or more input devices, the recommendation to initiate the contact with the at least one entity at a given moment in time, wherein the haptic interface indicates a location of the at least one entity, relative to the user, within the vicinity in the public space, and a direction at which to initiate the contact.

7. The computer program product of claim 6, wherein the one or more input devices communicatively coupled to the one or more processors comprise at least one wearable device worn by the user.

8. The computer program product of claim 7, wherein the environmental data within the defined vicinity of the user comprises expressed opinions in social media by the user and correlated values of bodily parameters measured from the user in an event of knowledge about particular event related to the subject.

9. The computer program product of claim 6, further comprising:
obtaining, by the one or more processors, via the interface, a response comprising an acceptance or a rejection of the recommendation.

10. The computer program product of claim 6, wherein identifying the one or more entities within the vicinity of the user further comprises, for each entity:
extracting, by the one or more processors, from the environmental data, at least one facial image of the entity; and
utilizing, by the one or more processors, a facial recognition program to identify the entity.

11. A computer system comprising:
a memory;

one or more processors in communication with the memory;

program instructions executable by the one or more processors in a shared computing environment via the memory to perform a method, the method comprising:
- obtaining, by the one or more processors, based on monitoring a defined vicinity of a user when the user is in a given public space, via one or more input devices communicatively coupled to the one or more processors, the one or more input devices comprising an audio capture device and an image capture device, environmental data comprising captured audio data and captured image data;
- obtaining, by the one or more processors, a user profile for the user, wherein the user profile comprises a prioritization of core attributes selected from the group consisting of: hierarchy, physiological, safety, love and belonging, esteem, and self-actualization;
- identifying, by the one or more processors, based on the environmental data, one or more entities within the vicinity of the user;
- based on the identifying, obtaining, by the one or more processors, a subject profile for each entity of the one or more entities, wherein the subject profile comprises a prioritization of the one or more pre-defined core attributes;
- obtaining, based on the identifying, historical data describing conversations between each entity of the one or more entities and the user and based on the monitoring of the defined vicinity, circumstantial attributes comprising one or more activities each entity of the one or more entities is presently engaged in in the given public space;
- predicting, by the one or more processors, a classification representing a perceived positive or negative outcome of the user initiating a contact with each entity of the one or more entities, wherein the predicting comprises:
  - applying a classifier algorithm to the user profile each subject profile, a classification representing a perceived positive or negative outcome of the user initiating a contact with each entity of the one or more entities, wherein the classifier algorithm applies a hypothesis generated utilizing a machine learning model trained with historical information to identify features in past positive interactions; and
  - adjusting, by the one or more processors, the perceived positive or negative outcome of the user initiating the contact with each entity of the one or more entities, based on the historical data and the circumstantial attributes;
- based on predicting a positive outcome for at the user initiating the contact with at least one entity of the one or more entities, generating, by the one or more processors, a recommendation to initiate the contact with the at least one entity; and
- transmitting, by the one or more processors, to the user, via a haptic interface of the one or more input devices, the recommendation to initiate the contact with the at least one entity at a given moment in time, wherein the haptic interface indicates a location of the at least one entity, relative to the user, within the vicinity in the public space, and a direction at which to initiate the contact.

12. The computer system of claim 11, wherein the one or more input devices communicatively coupled to the one or more processors comprise at least one wearable device worn by the user.

13. The computer system of claim 12, wherein the environmental data within the defined vicinity of the user comprises expressed opinions in social media by the user and correlated values of bodily parameters measured from the user in an event of knowledge about particular event related to the subject.

14. The computer system of claim 11, further comprising:
obtaining, by the one or more processors, via the interface, a response comprising an acceptance or a rejection of the recommendation.

15. The computer system of claim 11, wherein identifying the one or more entities within the vicinity of the user further comprises, for each entity:
- extracting, by the one or more processors, from the environmental data, at least one facial image of the entity; and
- utilizing, by the one or more processors, a facial recognition program to identify the entity.

* * * * *